US010358365B2

United States Patent
Tabata et al.

(10) Patent No.: US 10,358,365 B2
(45) Date of Patent: Jul. 23, 2019

(54) DISTRIBUTOR PIPE AND TRICKLING FILTER

(71) Applicant: Metawater Co., Ltd., Tokyo (JP)

(72) Inventors: Masao Tabata, Tokyo (JP); Tomoki Kurinami, Tokyo (JP)

(73) Assignee: Metawater Co., Ltd., Chiyoda-Ku (JP)

( * ) Notice: Subject to any disclaimer, the term of this patent is extended or adjusted under 35 U.S.C. 154(b) by 143 days.

(21) Appl. No.: 15/256,932

(22) Filed: Sep. 6, 2016

(65) Prior Publication Data

US 2016/0368799 A1  Dec. 22, 2016

Related U.S. Application Data

(63) Continuation of application No. PCT/JP2014/079631, filed on Nov. 7, 2014.

(30) Foreign Application Priority Data

Mar. 28, 2014  (JP) .................................. 2014-070129

(51) Int. Cl.
*B05B 1/20* (2006.01)
*C02F 3/04* (2006.01)
(Continued)

(52) U.S. Cl.
CPC ................ *C02F 3/043* (2013.01); *B05B 1/20* (2013.01); *B05B 3/06* (2013.01); *B05B 3/02* (2013.01);
(Continued)

(58) Field of Classification Search
CPC ... C02F 3/043; C02F 3/04; B05B 1/20; B05B 3/06
(Continued)

(56) References Cited

U.S. PATENT DOCUMENTS 2,314,423 A * 3/1943 Page ...................... C02F 3/043
                                                              239/254
2,601,430 A    6/1952 Carter, Jr.
(Continued)

FOREIGN PATENT DOCUMENTS

GB         268576 A     4/1927
JP     35-032969 Y2    12/1960
(Continued)

OTHER PUBLICATIONS

"Guidelines and Commentary for Designing Sewage Plants," supervised by Ministry of Construction, issued by Japan Sewage Works Association in 1972 (English translation of selected part of p. 316 and 321).
(Continued)

*Primary Examiner* — Claire A Norris
(74) *Attorney, Agent, or Firm* — Burr & Brown, PLLC

(57) ABSTRACT

A distributor pipe includes: a main pipe including a cylindrical part; and a plurality of branch pipes communicating with the main pipe and arranged, on a cylindrical curved surface of the main pipe, side by side along a longitudinal direction of the main pipe. A pipe diameter ratio $D_1/D_0$ of a pipe diameter $D_1$ of the branch pipe to a pipe diameter $D_0$ of the main pipe is greater than 0.2 and less than 0.8, and the plurality of branch pipes are arranged according to: respective effluent flow ratios, at a time a liquid flows into the main pipe in a predetermined flow velocity range, determined in accordance with respective arrangement orders of the plurality of branch pipes along a direction in which the liquid flows and along the longitudinal direction of the main pipe; and respective areas of circular or hollow-circular sections allotted to the plurality of branch pipes.

14 Claims, 13 Drawing Sheets

(51) Int. Cl.
   *B05B 3/06*   (2006.01)
   *B05B 3/02*   (2006.01)
   *C02F 103/00* (2006.01)

(52) U.S. Cl.
   CPC .... *C02F 2103/005* (2013.01); *C02F 2209/40* (2013.01); *Y02W 10/15* (2015.05)

(58) Field of Classification Search
   USPC .......................................... 239/254; 210/150
   See application file for complete search history.

(56) References Cited

U.S. PATENT DOCUMENTS

| | | | |
|---|---|---|---|
| 3,215,274 A | | 11/1965 | Schreiber |
| 3,528,549 A | | 9/1970 | Ray |
| 3,675,850 A | * | 7/1972 | Ebert .................. B01D 24/007 239/254 |
| 3,876,543 A | | 4/1975 | Schreiber et al. |
| 3,940,333 A | | 2/1976 | Schreiber et al. |
| 2004/0094490 A1 | * | 5/2004 | Miller .................. B01D 17/00 210/805 |
| 2014/0076788 A1 | | 3/2014 | Miyata et al. |

FOREIGN PATENT DOCUMENTS

| | | |
|---|---|---|
| JP | 49-021861 U | 2/1974 |
| JP | 50-037264 A | 4/1975 |
| JP | 51-034012 U | 3/1976 |
| JP | 56-064706 U | 5/1981 |
| JP | H08-135883 A1 | 5/1996 |
| JP | 10-328683 A1 | 12/1998 |
| JP | 2004-360843 A1 | 12/2004 |
| JP | 2007-160280 A1 | 6/2007 |
| WO | 2012/161339 A1 | 11/2012 |

OTHER PUBLICATIONS

Kosoku Sansui Roshoho o Saiyo shita Gesui Shorijo no Unten ni Kansuru Shiryoshu, Technical Note of PWRI, No. 4264, pp. 28 to 31, 2013, Internet <URL:http://www.db.pwri.go.jp/pdf/d8113.pdf>.

Kaigai Muke Gijutsu Kakunin Dai Ichi Go no Gijutsu Kakuninsho no Juyo Senshinteki Shoenegata Gesui Shori System (Metawater Co., Ltd.), Kisha Happyo Shiryo, Mar. 24, 2014, Internet <URL:http://www.jswa.go.jp/kisya/h25pdf/0324kisya.pdf>.

International Search Report and Written Opinion (Application No. PCT/JP2014/079631) dated Feb. 10, 2015.

Indian Office Action (Application No. 201647028136) dated Apr. 22, 2019.

* cited by examiner

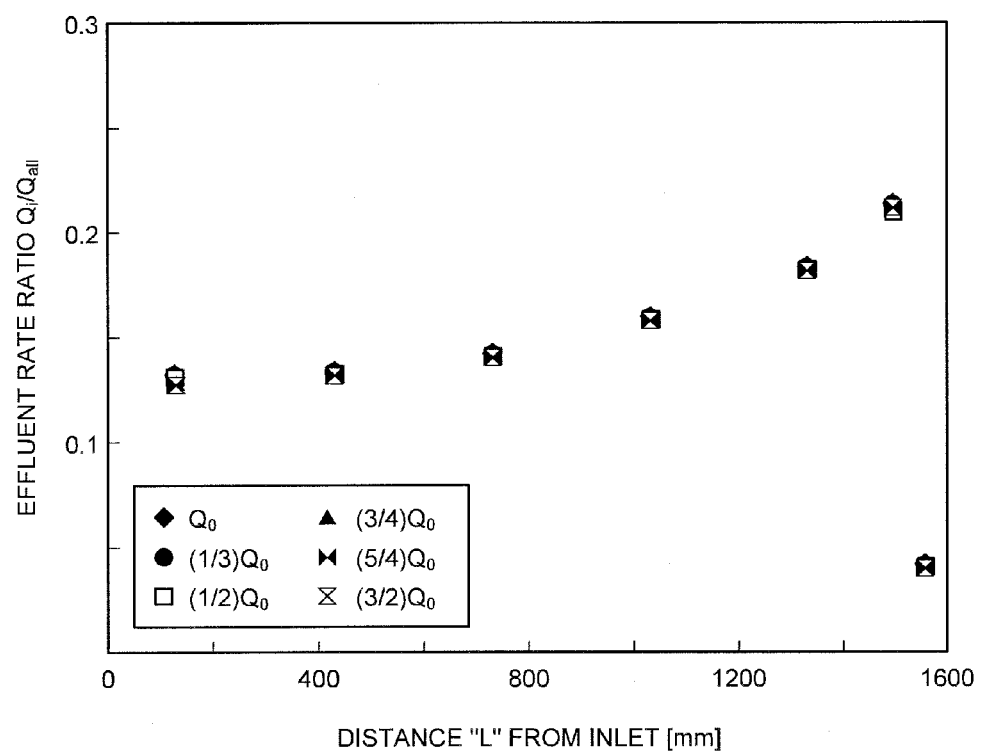

DISTRIBUTOR PIPE AND TRICKLING FILTER

CROSS-REFERENCE TO RELATED APPLICATIONS

This application is a continuation application of PCT international Application No. PCT/JP2014/079631 filed on Nov. 7, 2014, which designates the United States, incorporated herein by reference, and which claims the benefit of priority from Japanese Patent Application No. 2014-070129, filed on Mar. 28, 2014, the entire contents of all of which are incorporated herein by reference.

BACKGROUND OF THE INVENTION

Field of the Invention

The present invention relates to a distributor pipe having a plurality of outlets, and a trickling filter using the distributor pipe.

Description of Related Art

Conventionally, various sewage treatment systems, which treat sewage such as household wastewater or industrial wastewater, have been utilized by using a conventional activated sludge process, a trickling filter process or the likes. For example, in a sewage treatment system using a conventional activated sludge process, aeration treatment of supplying oxygen to many types of aerobic microorganisms present in a reaction tank is performed while sewage to be treated is flown into the reaction tank. Accordingly, organic substances included in the sewage in the reaction tank are subjected to decomposition treatment by action of the aerobic microorganisms, and as a result, quality of the treated water can be stably obtained.

Further, in a wastewater treatment plant adopting such a sewage treatment system, an aerobic treatment, which is represented by an activated sludge process, is carried out. In this activated sludge process, after organic components in wastewater are subjected to decomposition treatment, a process of discharging the treated wastewater to rivers and the like is performed. The trickling filter process is one of such aerobic treatment methods, and in the trickling filter process, a filtering medium made of a bed of rocks, stones, plastic, or the like is packed into a trickling filter, and a layer of biofilm is formed on the surface of the filtering medium. In the trickling filter, wastewater is supplied to a filter bed from a top portion of the apparatus, and the wastewater is subjected to aerobic treatment by the biofilm formed on the filtering medium. In this specification, the filtering medium packed into the trickling filter will be referred to as a "filter bed".

To distribute wastewater onto the filter bed, a fixed dosing tank distributor, a fixed nozzle distributor, or a rotary distributor is used. Of these distributors, the rotary distributor has been mainly adopted because of its equipment cost and uniformity of distribution (sees Non Patent Literature 1). According to a method of arranging this conventional rotary distributor, a support pillar along a height direction is arranged on a bottom portion of a trickling filter, and the rotary distributor is arranged on a top portion of this support pillar. The arranged rotary distributor sprays the wastewater all over the filter bed by rotating its arms with an electric motor or by using reaction force of the spraying.

Further, for the fixed dosing tank distributor or the fixed nozzle distributor, a top spraying form not provided with a support pillar has been proposed (Patent Literature 1 & Patent Literature 2). In the fixed dosing tank described in Patent Literature 1, a method of arranging the filtering medium for dispersion is adopted in order to ensure uniformity of distribution. Further, in the fixed type nozzle form described in Patent Literature 2, a method of arranging a dispersion tool is adopted in order to ensure uniformity of distribution.

CITATION LIST

Patent Literature

Patent Literature 1: Japanese Patent Application Laid-open No. H10-328683
Patent Literature 2: Japanese Patent Application Laid-open No. 2007-160280

Non Patent Literature

Non Patent Literature 1: "Guidelines and Commentary for Designing Sewage Plants", supervised by Ministry of Construction, issued by Japan Sewage Works Association in 1972

SUMMARY OF THE INVENTION

Technical Problem

However, according to the inventors, in the trickling filters described in "Guidelines and Commentary for Designing Sewage Plants", supervised by Ministry of Construction, issued by Japan Sewage Works Association in 1972, Japanese Patent Application Laid-open No. H10-328683 and Japanese Patent Application Laid-open No. 2007-160280, fluctuation in spraying strength has been found in the distribution of the spraying strength, and uniform distribution over the filter bed has been difficult to be achieved. Further, in sewage treatment plants, fluctuation in processing load problematically makes uniform distribution difficult.

It is an object of the present invention to provide a distributor pipe which can reduce fluctuation in spraying strength and achieve uniform distribution for a filter bed in a trickling filter, and a trickling filter which uses the distributor pipe.

Solution to Problem

A distributor pipe according to one aspect of the present invention includes: a main pipe including a cylindrical part; and a plurality of branch pipes communicating with the main pipe and arranged, on a cylindrical curved surface of the main pipe, side by side along a longitudinal direction of the main pipe, wherein a pipe diameter ratio $D_1/D_0$ of a pipe diameter $D_1$ of the branch pipe to a pipe diameter $D_0$ of the main pipe is greater than 0.2 and less than 0.8, and the plurality of branch pipes are arranged according to: respective effluent flow ratios, at a time a liquid flows into the main pipe in a predetermined flow velocity range, determined in accordance with respective arrangement orders of the plurality of branch pipes along a direction in which the liquid flows and along the longitudinal direction of the main pipe; and respective areas of circular or hollow-circular sections allotted to the plurality of branch pipes.

The distributor pipe according to one aspect of the present invention in which the predetermined flow velocity range is greater than 0.5 m/s and not greater than 5.0 m/s.

The distributor pipe according to one aspect of the present invention in which the number of the branch pipes is five to nine.

The distributor pipe according to one aspect of the present invention in which the ratio $D_1/D_0$ of the pipe diameter $D_1$ of the branch pipe to the pipe diameter $D_0$ of the main pipe is 0.5 to 0.7.

A trickling filter according to another aspect of the present invention includes: the distributor pipe according to the above-described invention; and a filter bed performing a biological treatment to treatment target water discharged from the distributor pipe, wherein an area in a circular or hollow-circular section allotted to each of the branch pipes is a spraying area along a horizontal plane over the filter bed.

The trickling filter according to another aspect of the present invention in which the distributor pipe of the trickling filter is held by being suspended from above the filter bed.

Advantageous Effects of Invention

The distributor pipe and the trickling filter according to the present invention can reduce fluctuation in spraying strength and achieve uniform distribution for a filter bed.

BRIEF DESCRIPTION OF DRAWINGS

FIG. 6 is a graph illustrating dependence on distances away from an inlet, of effluent flow ratios in the distributor pipe, with respect to the influent rates according to the embodiment.

DETAILED DESCRIPTION OF THE INVENTION

Hereinafter, an embodiment of the present invention will be described with reference to the drawings. In all of the drawings of the embodiment, the same signs will be appended to the same or corresponding portions. Further, the present invention is not limited by the embodiment described below.

Figure 1:
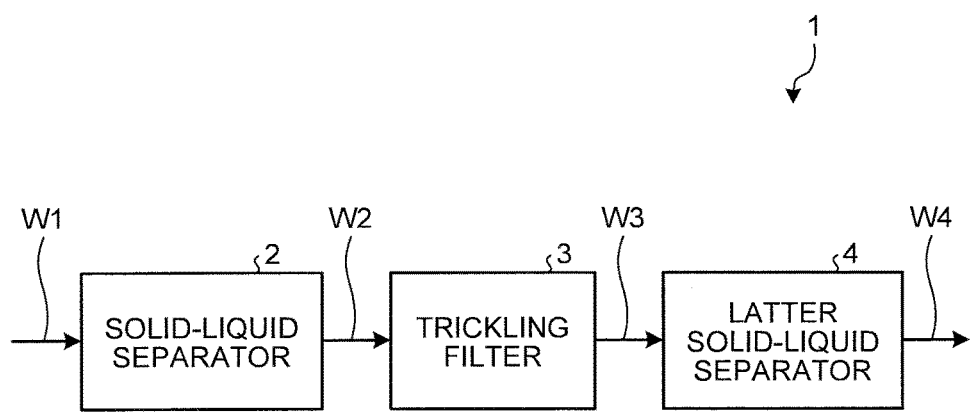
FIG. 1 is a block diagram illustrating a schematic configuration of a sewage treatment system according to an embodiment of the present invention.

First, a configuration of a sewage treatment system according to the embodiment of the present invention will be described. FIG. 1 is a block diagram illustrating a schematic configuration of the sewage treatment system according to the embodiment. As illustrated in FIG. 1, a sewage treatment system 1 according to this embodiment includes a solid-liquid separator 2, a trickling filter 3, and a latter solid-liquid separator 4. The solid-liquid separator 2 performs a first water treatment to sewage water W1 to separate solid components from treatment target water W2 in the sewage water W1. Instead of the solid-liquid separator 2, a conventional primary sedimentation tank may be provided. Further, the trickling filter 3 is arranged downstream from the solid-liquid separator 2, and performs a second water treatment of biological treatment to the treatment target water W2 to obtain treated water W3. The latter solid-liquid separator 4 is arranged downstream from the trickling filter 3 and performs a third water treatment such as sedimentation and filtration, and thus treated water W4 is obtained to discharge to an outside environment. Instead of the latter solid-liquid separator 4, other apparatus, such as a biofilm filter, may be arranged. For example, a solid-liquid separator not including a filter layer in its sedimentation unit, or an aeration type biofilm filter, or a normal final sedimentation tank may be arranged.

Figure 2:
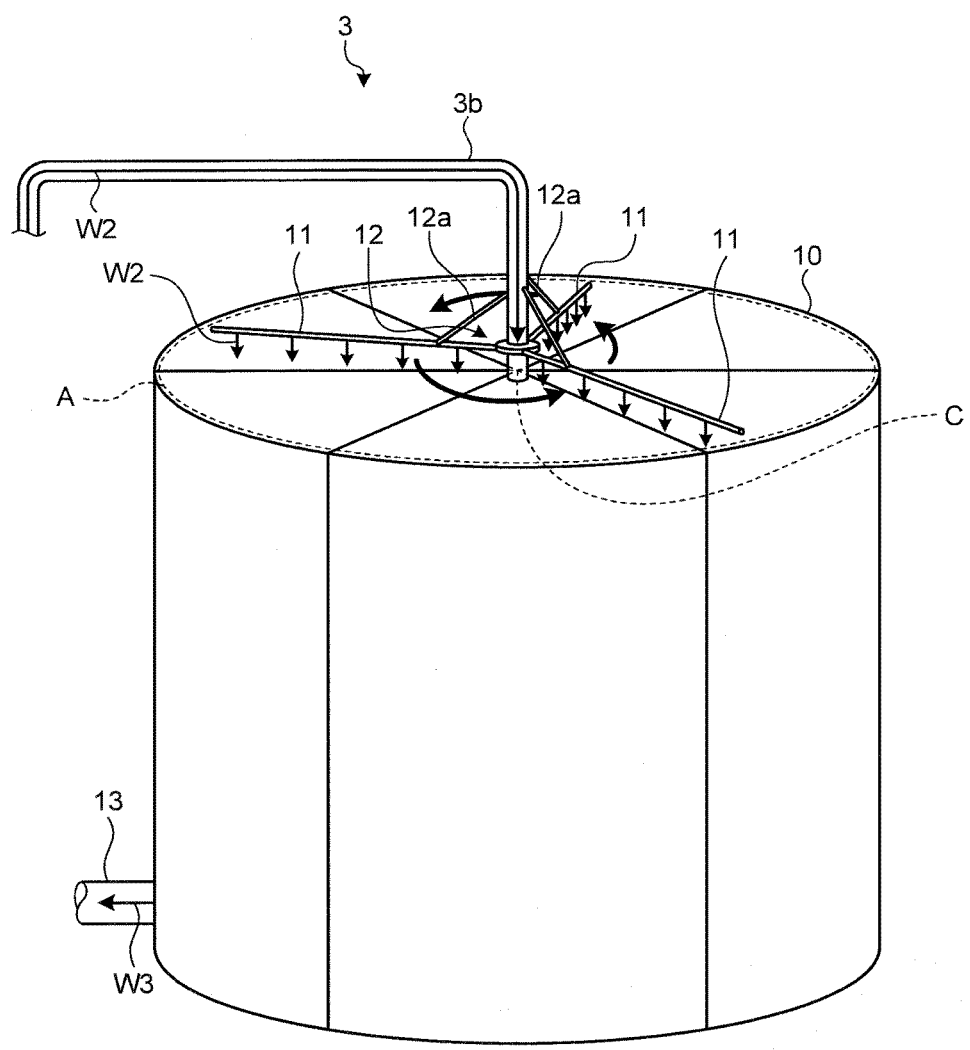
FIG. 2 is a schematic diagram illustrating an example of a configuration of a trickling filter according to the embodiment.
Figure 3:
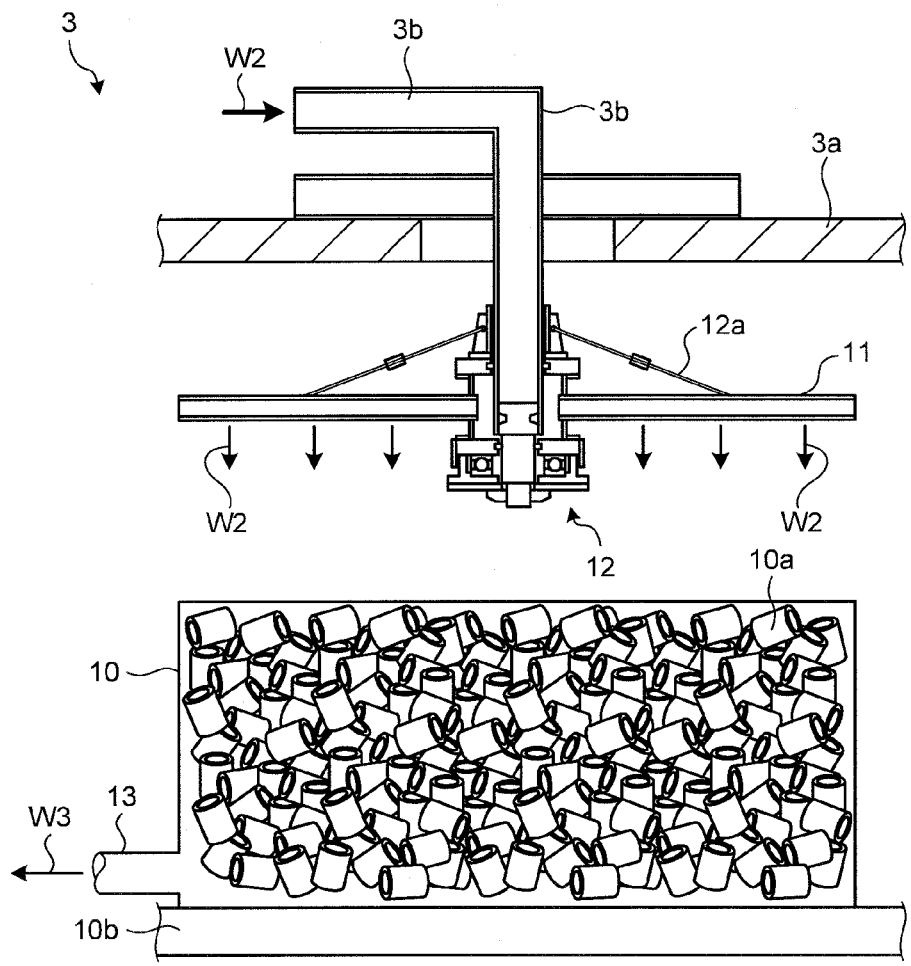
FIG. 3 is a sectional side view illustrating the example of the configuration of the trickling filter according to the embodiment.

Next, the trickling filter 3 will be described. FIG. 2 is a schematic diagram illustrating an example of a configuration of the trickling filter 3 of the sewage treatment system 1 according to this embodiment, and FIG. 3 is a sectional side view of the trickling filter 3 illustrated in FIG. 2. As illustrated in FIG. 2 and FIG. 3, the trickling filter 3 according to this embodiment includes: a filter bed body 10; a distributor pipe 11; a rotary distributor 12 including a wire 12a; and a vent pipe 13, and the trickling filter 3 includes an influent pipe 3b fixed to and supported by an apparatus ceiling 3a. The filter bed body 10 includes a filtering medium packed bed, which is packed with filtering medium 10a adhered with microorganisms. The filtering medium 10a, of such as polyurethane or polypropylene, is used for carrying out biological treatment through the microorganisms that adhere to its surface. A specific gravity of the filtering medium 10a is, for example, "0.9", which is approximate to the specific gravity of water (=1.0). In this embodiment, the filtering medium 10a is constituted by substance which is, for example, cylindrically shaped, as illustrated in FIG. 3.

Further, as illustrated in FIG. 2 and FIG. 3, the distributor pipes 11 which serve as spraying nozzles spray the treatment target water W2 supplied from the solid-liquid separator 2 to the inside of the filter bed body 10. The rotary distributor 12 is configured to support the distributor pipes 11 by the wire 12a and to enable the distributor pipes 11 to rotate in a plane around an axis, which is in a direction perpendicular to a longitudinal direction of the distributor pipes 11 and is near to, the end portion at influent side of the distributor pipes. The vent pipe 13 is a pipe for supplying the treated water W3 to the latter solid-liquid separator 4 by gravity flow or action of a pump or the like, from a bottom layer of the filter bed body 10.

The filter bed body 10 is a tank, which is provided on a filter bed bottom portion 10b and packed with the plurality of filtering media 10a with their surfaces having been adhered with the microorganisms, and the filter bed body 10 is formed of a plurality of treatment water tanks, specifically, for example, six treatment water tanks. The rotary distributor 12 is a spraying means that sprays the treatment target water W2 supplied from the solid-liquid separator 2 to the inside of each of the treatment water tanks of the filter bed body 10 by rotating the distributor pipes 11 around an axis C. Further, the influent pipes 3b communicate with the solid-liquid separator 2 illustrated in FIG. 1. The rotary distributor 12 has a rotating mechanism configured to be rotatable along a circumferential direction of the filter bed body 10, by, for example, the reaction force generated by the discharging of the treatment target water W2. A motor may be provided in the rotary distributor 12 and by the motor, the distributor pipes 11 may be driven to rotate.

Further, at a top portion of the filter bed body 10, a plurality of, specifically, for example, three of, the distributor pipes 11 are provided to be radially directed to a circumferential portion A of the filter bed body 10. The number of the distributor pipes 11 coupled to the rotary distributor 12 is not limited to three, and may be one or plural. To the distributor pipes 11, the treatment target water W2 is supplied from the solid-liquid separator 2 through the influent pipe 3b, and each distributor pipe 11 is rotated along the circumferential direction of the filter bed body 10 by propulsive power resulted from discharging of the treatment target water W2. Details of the distributor pipes 11 will be described later.

Further, the trickling filter 3 according to this embodiment adopts a suspension arrangement of supporting and fixing the rotary distributor 12 by suspending the rotary distributor 12 from the apparatus ceiling 3a. Accordingly, as compared with a support pillar type arrangement of providing a support pillar vertically on a filter bed bottom portion, the suspension arrangement achieves an increased effective filter bed area and thus an improved throughput. Further, arrangement of the rotary distributor 12 in an existing reaction tank, which has the apparatus ceiling 3a and is of, for example, a wastewater treatment plant for implementing aerobic treatment or anaerobic treatment, becomes easy. Accordingly, when a reaction tank in a conventional wastewater treatment plant is made into a trickling filter, large scale modification accompanying installation of the distributor pipes 11 becomes unnecessary, and thus the construction period can be shortened and the cost can be reduced.

(Distributor Pipes)

Figure 4:
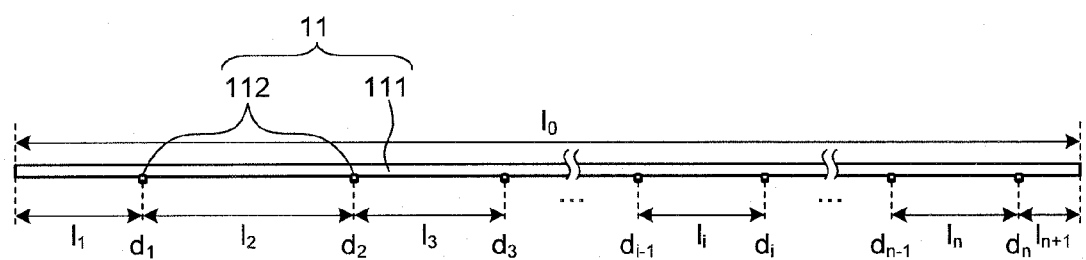
FIG. 4 is a schematic diagram illustrating a configuration of the whole distributor pipe according to the embodiment.
Figure 5A:
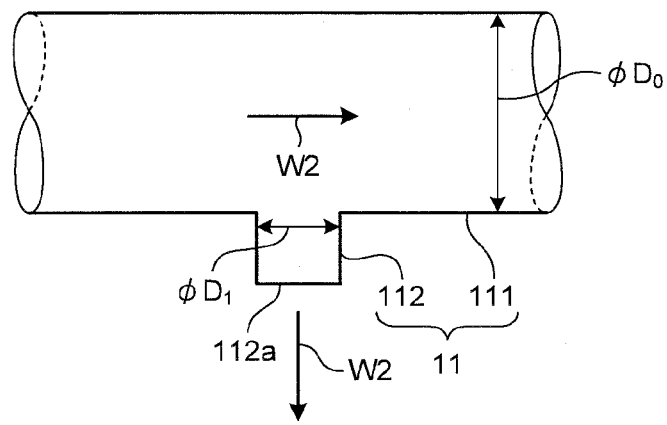
FIG. 5A is a schematic diagram illustrating a main pipe and one of branch pipes of the distributor pipe according to the embodiment.
Figure 5B:
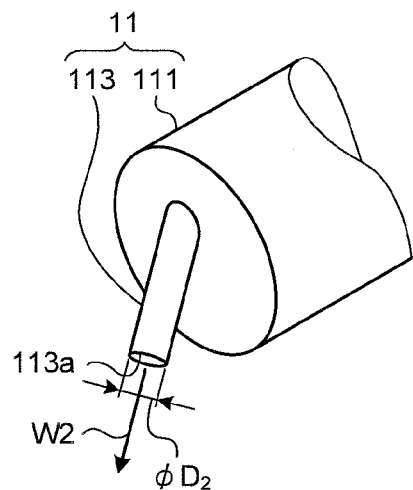
FIG. 5B is a schematic diagram illustrating a portion of an effluent end of the distributor pipe according to the embodiment in a case where a branch pipe is provided at the effluent end.

Next, the distributor pipes 11 serving as spraying nozzles, which are used in the trickling filter 3 of the sewage treatment system 1 configured as described above will be described. FIG. 4 is a schematic diagram illustrating a configuration of the whole distributor pipe 11 according to the embodiment. Further, FIG. 5A is a schematic diagram illustrating a main pipe 111 and one of branch pipes 112, of the distributor pipe 11, and FIG. 5B is a schematic diagram illustrating, for a case where a branch pipe 113 is provided at an end portion (hereinafter, "effluent end") opposite to the influent end of the distributor pipe 11, a part of the effluent end. In the distributor pipe 11, the influent end is an upstream side along flow of the treatment target water W2 and the effluent end is a downstream side along the flow of the treatment target water W2.

As illustrated in FIG. 4 and FIG. 5A, the distributor pipe 11 according to this embodiment is configured by having the main pipe 111 and the plurality of branch pipes 112. As illustrated in FIG. 4 and FIG. 5A further, the main pipe 111 is configured by having a hollow cylindrical part, for example. Furthermore, the branch pipe 112 forming a discharge pipe has, for example, a hollow cylindrical part and an outlet 112a for discharging a liquid, such as the treatment target water W2, to outside. These branch pipes 112 communicate with the hollow part of the main pipe 111 and are provided along the longitudinal direction of the main pipe 111 and side by side on a cylindrical side surface of the main pipe 111. A pipe diameter $D_0$ along a cross section perpendicular to the longitudinal direction of the main pipe 111 is, for example, 28 mm. In this specification, the pipe diameter means an outer diameter of the main pipe or branch pipe, and a wall thickness of a pipe is obtained, for example, according to the conventionally known Barlow's formula. Specifically, the main pipe 111 preferably has a wall thickness of about 2.8 mm to 3.0 mm, the branch pipe 112 preferably has a wall thickness of about 2.1 mm to 3.0 mm, and the branch pipe 113 preferably has a wall thickness of about 1.7 mm to 2.0 mm. Further, the pipe diameter $D_1$ along the cross section perpendicular to the longitudinal direction of the branch pipe 112 is greater than 0.2 times and less than 0.8 times the pipe diameter $D_0$, for example, 15.7 mm, and a length of a part protruded from the main pipe 111 along a longitudinal direction thereof is, for example, 11.2 mm. When the treatment target water W2 is supplied to the distributor pipe 11 and the treatment target water W2 flows into the main pipe 111, the treatment target water W2 is diverged into each of the branch pipes 112 and discharged through the outlets 112a to outside. The discharged treatment target water W2 is sprayed over the filtering medium packed bed of the filter bed body 10.

Further, as illustrated in FIG. 4, the branch pipes 112 are sequentially placed side by side in the longitudinal direction of the main pipe 111, with an interval $l_1$ between the influent end of the main pipe 111 and the first branch pipe (position $d_1$), an interval $l_2$ between the first branch pipe 112 and the second branch pipe 112 (position $d_2$), and so on. An interval between the respective branch pipes 112 will be hereinafter referred to as an interval $l_i$ between the i-th branch pipe 112 (position $d_i$) and the branch pipe 112 adjacent thereto at an influent end side (position $d_{i-1}$), an interval $l_{n+1}$ between the n-th branch pipe 112 (position $d_n$) positioned nearest to the effluent end and the effluent end of the main pipe 111, or the like.

Further, as illustrated in FIG. 5B, the branch pipe 113 forming a discharge nozzle (discharge pipe) may be provided at the effluent end opposite to the influent side of the main pipe 111, and in this case, the distributor pipe 11 is configured of the main pipe 111, and the branch pipes 112 and 113. This branch pipe 113 communicates with the hollow part of the main pipe 111, at the end portion of the main pipe 111 opposite to the treatment target water W2 influent side. The branch pipe 113 has, for example, a hollow cylindrical part and an outlet 113a for discharging a liquid, such as the treatment target water W2, to the outside. When the treatment target water W2 flows in the main pipe 111, the treatment target water W2 diverges to the part of the branch pipe 113 to be discharged outside.

When the branch pipe 113 is provided at the effluent end of the distributor pipe 11, since pressure fluctuation inside the distributor pipe 11 is reduced, an effect of effluent rates in the branch pipes 112 and 113 being stabilized is obtained. That is, if the branch pipe 113 is not provided, or if the branch pipe 113 is closed, influence by the pressure fluctuation in the main pipe 111 due to the flow of the treatment target water W2 is received by the branch pipes 112. Therefore, the effluent rates from the branch pipes 112 may fluctuate over time and the fluctuation over time of the effluent may become somewhat unstable. Thus, in a period of, for example, one day, pressure fluctuation due to increase and decrease in the treatment rate of the treatment target water W2 may be caused. In contrast, by providing the branch pipe 113 at the effluent end of the distributor pipe 11, since this branch pipe 113 acts as a release hole for the pressure fluctuation, the instability with respect to the pressure fluctuation in the main pipe 111 can be reduced and thus variation with respect to the pressure fluctuation in the distributor pipe 11 can be reduced. Accordingly, the distributor pipe 11 can be configured to be not susceptible to the pressure fluctuation due to the increase and decrease in flow rate in the cycle of, for example, one day.

The inventors have intensively conducted studies on the distributor pipe 11 in order to improve the throughput further. First, for the distributor pipe 11 illustrated in FIG. 4, the inventors have variously changed influent rate $Q_{all}$ of the treatment target water W2 supplied to the influent end of the distributor pipe 11 within a range of 1/2 to 3/2 of a reference influent rate $Q_0$ and derived an effluent rate $Q_i$ (i=1, 2, ..., 7) of the treatment target water W2 discharged from each of the branch pipes 112 and 113. A main pipe length $l_0$ along the longitudinal direction of the main pipe 111 of the distributor pipe 11 was assumed to be 1600 mm, the number of branch pipes 112 was assumed to be six (in FIG. 4, n=6), the number of branch pipes 113 was assumed to be one, and a pipe diameter ratio among the main pipe 111, branch pipe 112, and branch pipe 113 was assumed to be "1.0:0.6:0.25". FIG. 6 is a graph illustrating dependence on distances from an inlet of effluent flow ratios in the distributor pipe 11 configured as described above, with respect to the influent rates calculated by using numerical analysis. Distance L (mm) away from the inlet in FIG. 6 is distance $L_k$ of each of the branch pipes 112 from the influent end obtained by the following Equation (1).

$$L_k = \sum_{i=1}^{k} l_i \qquad (1)$$

From FIG. 6, it is found that regardless of how the influent rate $Q_{all}$ is changed, the ratio (hereinafter, "effluent flow ratio") of $Q_i/Q_{all}$ of the discharge flow rate of the treatment target water W2 discharged from each of the branch pipes 112 to the influent rate does not change respectively. The inventors have measured the effluent rates as described above in the distributor pipe 11 illustrated in FIG. 4, and have confirmed the results as described above. Further, in the branch pipe 113, although the effluent flow ratio $Q_7/Q_{all}$ becomes extremely small, regardless of how the influent rate $Q_{all}$ is changed, the effluent flow ratio $Q_7/Q_{all}$ remains unchanged. From the conventional techniques, it has been predicted that the closer the branch pipe 112 is to the influent side of the distributor pipe 11, the larger the discharged flow rate basically tends to become. However, from the above, the inventors have newly found that the branch pipes 112 sometimes have a characteristics of their effluent flow ratios $Q_i/Q_{all}$ monotonically increasing along from the influent side to the effluent side of the distributor pipe 11.

Figure 7:
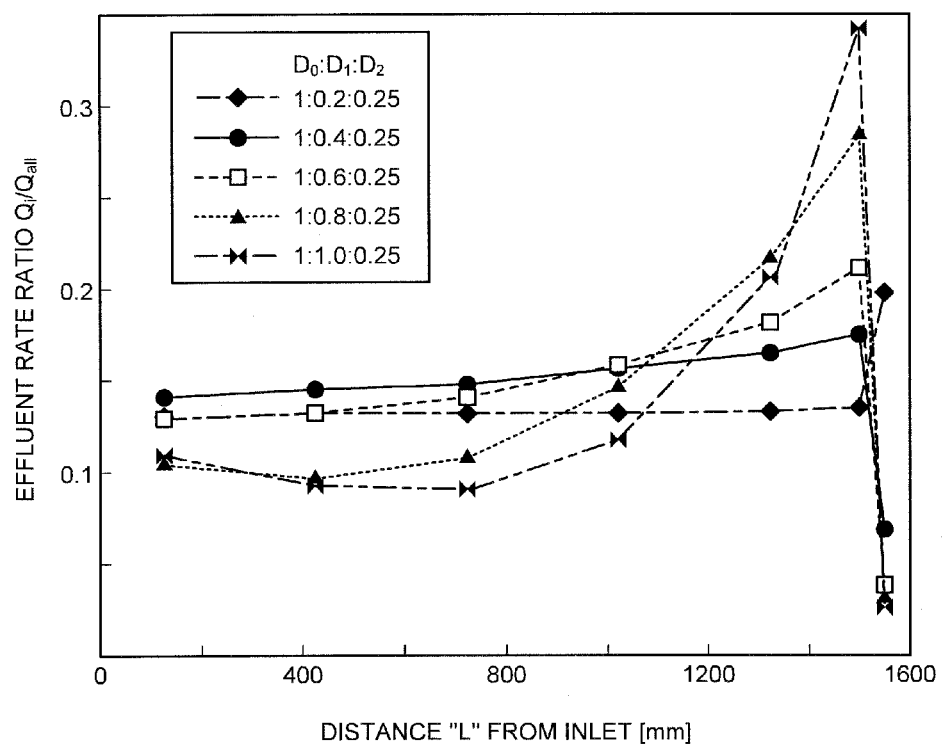
FIG. 7 is a graph illustrating dependence on distances away from an inlet, of effluent flow ratios of branch pipes in the distributor pipe with respect to the ratios among a main pipe diameter, a branch pipe diameter, and a diameter of a branch pipe at an effluent end of the distributor pipe according to the embodiment.

Further, the inventors have variously changed the ratio of the pipe diameter $D_1$ of these branch pipes 112 to the pipe diameter $D_0$ of the main pipe 111 and pipe diameter $D_2$ of the branch pipe 113, to derive the effluent flow ratio $Q_i/Q_{all}$ of the treatment target water W2 discharged from each of the branch pipes 112. The influent rate $Q_{all}$ is assumed to be 67 L/min, the number of branch pipes 112 to be six, and the number of branch pipes 113 to be one. Further, the ratio between the pipe diameter $D_0$ of the main pipe 111 and the pipe diameter $D_2$ of the branch pipe 113 is assumed to be, for example, "1:0.25". As to this ratio, from findings obtained by the studies of the inventors, if the pipe diameter ratio $D_2/D_0$ of the pipe diameter $D_2$ of the branch pipe 113 to the pipe diameter $D_0$ of the main pipe 111 is increased too much, the flow rate of the treatment target water W2 sprayed over the filter bed body 10 is reduced and treatment performance is decreased. Accordingly, the pipe diameter ratio $D_2/D_0$ of the pipe diameter $D_2$ of the branch pipe 113 to the pipe diameter $D_0$ of the main pipe 111 is desirably around "0.25". The pipe diameter ratio $D_1/D_0$ of the pipe diameter $D_1$ of the branch pipe 112 to the pipe diameter $D_0$ of the main pipe 111 is variously changed in a range of 0.2 to 1.0, with the influent rate $Q_{all}$ being constant at, for example, $Q_0$ as shown in FIG. 6. FIG. 7 illustrates a graph illustrating dependence on distances away from the inlet, of the effluent flow ratios $Q_i/Q_{all}$ in the branch pipes 112 of the distributor pipe 11, with respect to the ratios among the pipe diameter $D_0$ of the main pipe 111, the pipe diameter $D_1$ of the branch pipe 113, and the pipe diameter $D_2$ of the branch pipe 113, in the distributor pipe 11.

From FIG. 7, overall, the flow rates discharged from the branch pipes 112 are found to increase with the distances L away from the inlet. Further, when the ratio of the pipe diameter $D_1$ of the branch pipe 112 to the pipe diameter $D_0$ of the main pipe 111 is "0.2", the flow rate discharged from the branch pipe 113 becomes larger in proportion to the flow rate discharged from the branch pipe 112. That is, if the ratio of the pipe diameter $D_1$ of the branch pipe 112 to the pipe diameter $D_0$ of the main pipe 111 is equal to or less than "0.2", the treatment target water W2 flown in is found to be discharged mainly from the branch pipe 113. On the contrary, if the ratio of the pipe diameter $D_1$ of the branch pipe 112 to the pipe diameter $D_0$ of the main pipe 111 is larger than "0.2", the flow rate of the treatment target water W2 discharged from the branch pipe 113 is found to be largely reduced and the treatment target water W2 is found to be discharged mainly from the outlets of each of the branch pipes 112. Further, according to findings by the inventors, if the ratio of the pipe diameter $D_1$ of the branch pipe 112 to the pipe diameter $D_0$ of the main pipe 111 is as small as equal to or less than "0.2", relatively to the necessary effluent from the outlet 112a of the branch pipe 112, the pipe diameter $D_0$ of the main pipe 111 is too large. As a result, problematically, the cost is increased and easiness of the construction is reduced.

Further, if the ratio of the pipe diameter $D_1$ of the branch pipe 112 to the pipe diameter $D_0$ of the main pipe 111 is "0.8" or "1.0", the flow rate discharged from the second branch pipe 112 away from the inlet becomes less than the flow rate discharged from the first branch pipe 112 away from the inlet. That is, if the ratio of the pipe diameter $D_1$ of the branch pipe 112 to the pipe diameter $D_0$ of the main pipe 111 is equal to or greater than "0.8", from the influent side to the effluent side of the main pipe 111, the effluent flow ratios $Q_i/Q_{all}$ are found to not monotonically increase from the influent side (inlet side) towards the effluent side. In other words, if the ratio of the pipe diameter $D_1$ of the branch pipe 112 to the pipe diameter $D_0$ of the main pipe 111 is equal to or greater than "0.8", problematically, the effluent from each of the branch pipes 112 becomes unable to maintain its linearity with respect to the distances L away from the inlet, and designing becomes difficult. Therefore, the inventors have found that the ratio $D_1/D_0$ of the pipe diameter $D_1$ of the branch pipe 112 to the pipe diameter $D_0$ of the main pipe 111 is preferably greater than "0.2" and less than "0.8". Based on FIG. 6 and FIG. 7, the inventors have further investigated with the number of the branch pipes 112 being a number other than six, and found that if the number of branch pipes 112 is about five to nine, with seven as a mean number, the ratio $D_1/D_0$ of the pipe diameter $D_1$ of the branch pipe 112 to the pipe diameter $D_0$ of the main pipe 111 is preferably equal to or greater than "0.4" and less than "0.8", more preferably equal to or greater than "0.5" and equal to or less than "0.7", and even more preferably equal to or greater than "0.5" and equal to or less than "0.65".

Figure 8:
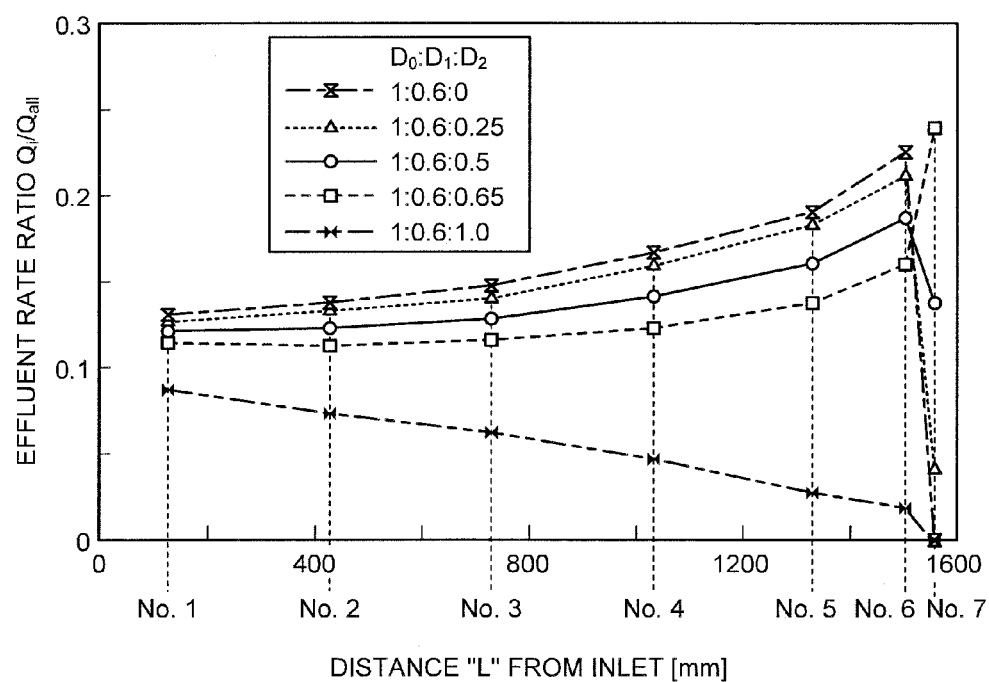
FIG. 8 is a graph illustrating dependence on distances away from an inlet, of effluent flow ratios of branch pipes in the distributor pipe with respect to the ratios among a main pipe diameter, a branch pipe diameter, and a diameter of a branch pipe at an effluent end, of the distributor pipe according to the embodiment.

Further, the inventors have performed numerical analysis of the effluent flow ratios in the above described distributor pipe 11, for a case without the branch pipe 113 and for a case with the branch pipe 113 and the pipe diameter ratio $D_2/D_0$ to the pipe diameter $D_0$ of the main pipe 111 is variously changed. FIG. 8 is a graph illustrating dependence on distances away from the inlet of the effluent flow ratios in the distributor pipe for the case without the branch pipe 113 and for the case with the branch pipe 113, under the condition where six branch pipes 112 are provided, with respect to the pipe diameter ratios $D_2/D_0$ of the pipe diameter $D_2$ of the branch pipe 113 to the pipe diameter $D_0$ of the main pipe 111. In FIG. 8, "No." represents the orders of the branch pipes 112 or 113 from the inlet end of the distributor pipe 11 and the ratio of the pipe diameter $D_1$ of the branch pipe 112 to the pipe diameter $D_0$ of the main pipe 111 is "0.6".

FIG. 8 shows that, when the pipe diameter ratios $D_2/D_0$ of the pipe diameter $D_2$ of the branch pipe 113 to the pipe diameter $D_0$ of the main pipe 111 are changed between "0" (without provision of the branch pipe 113) to "0.65", the closer the branch pipe is to the effluent end side, the higher the flow rate of the treatment target water W2 from the branch pipe 112 becomes. That is, the effluent characteristics of the branch pipes 112 of the distributor pipe 11 are found to be not largely different between the cases of providing and not providing the branch pipe 113. Further, it is found that when the pipe diameter $D_2$ of the branch pipe 113 is greater than the pipe diameter $D_1$ of the branch pipe 112, that is, when the pipe diameter ratio $D_2/D_0$ is between "0.65" and "1.0", the flow rate flown out from the branch pipe 113 becomes higher than the flow rate flown out from the branch pipe 112.

Figure 9:
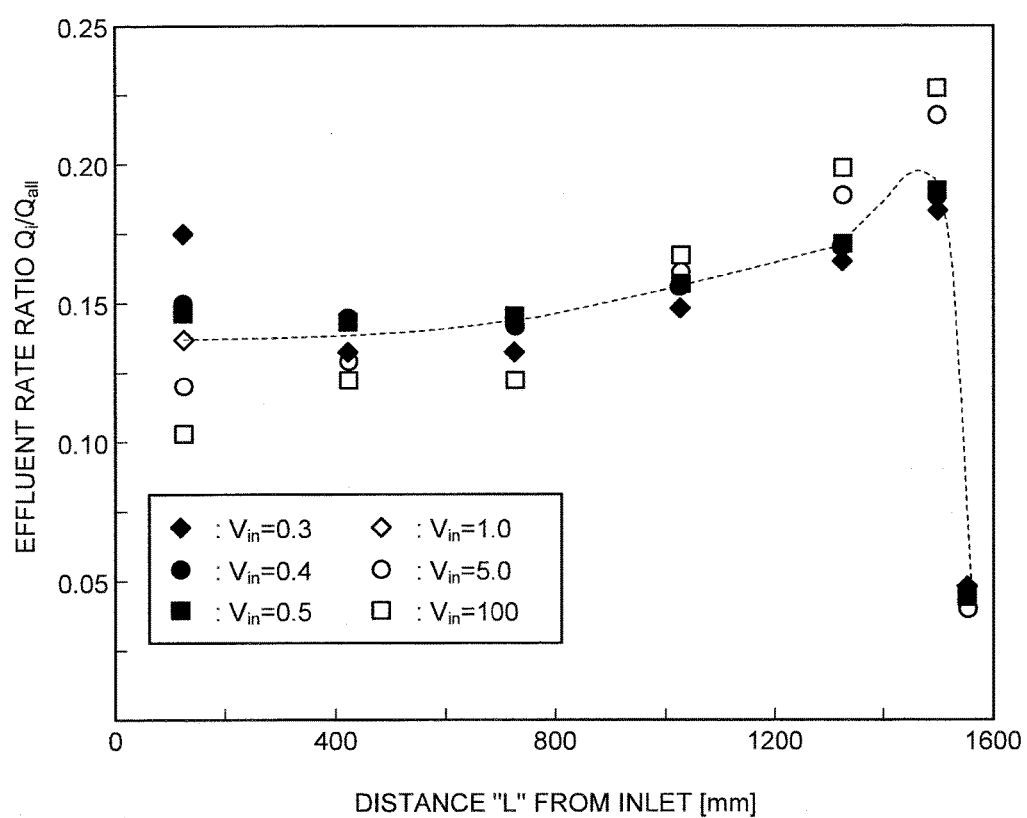
FIG. 9 is a graph illustrating dependence on distances away from an inlet, of effluent flow ratios of branch pipes in the distributor pipe with respect to the influent velocities, according to the embodiment.

Further, the inventors have conducted numerical analysis of the effluent flow ratios of the treatment target water W2 discharged from each of the branch pipes 112 and branch pipe 113 by variously changing the influent velocity in the above described distributor pipe 11 having six branch pipes 112 and one branch pipe 113. The results are illustrated in FIG. 9. FIG. 9 is a graph illustrating dependence on distances away from the inlet, of the effluent flow ratios $Q_i/Q_{all}$ in the branch pipes 112 of the distributor pipe 11, with respect to the influent velocities $V_{in}$. In FIG. 9, the influent velocity $V_{in}$ is in a range of 0.3 m/s to 100 m/s.

From FIG. 9, when the influent velocity $V_{in}$ of the treatment target water W2 is 0.3 m/s to 0.5 m/s, the effluent flow ratio, discharged from the second branch pipe 112 away from the inlet is found to be less than that from the first branch pipe 112 away from the inlet. That is, when the influent velocity $V_{in}$ of the treatment target water W2 is equal to or less than 0.5 m/s, the effluent flow ratios $Q_i/Q_{all}$ do not monotonically increase from the influent side to the effluent side of the main pipe 111. In other words, if the influent velocity $V_{in}$ of the treatment target water W2 is equal to or less than 0.5 m/s, problematically, the effluent from each of the branch pipes 112 becomes unable to maintain its linearity, and designing becomes difficult. The dotted line in FIG. 9 illustrates a boundary for when the effluent flow ratios $Q_i/Q_{all}$ monotonically increase in the branch pipes 112. Accordingly, the inventors have found that, to maintain a trend of the effluent characteristics that the effluent flow ratios monotonically increase with the distances L away from the inlet of the branch pipes 112, the lower limit of the influent velocity $V_{in}$ of the treatment target water W2 is preferably set to be greater than 0.5 m/s. Further, the inventors have calculated a volume occupied by the liquid and a volume occupied by the air in the main pipe 111 and branch pipes 112 with the influent velocity $V_{in}$ equal to or less than 0.5 m/s, and found that the inside of the main pipe 111 is not full of the treatment target water W2 and the effluent characteristics are changed. Furthermore, based on these findings, the inventors have conducted studies on the distributor pipe 11 with the ratio $D_1/D_0$ of the pipe diameter $D_1$ of the branch pipe 112 to the pipe diameter $D_0$ of the main pipe 111 being "0.8", and confirmed that the main pipe 111 is able to be brought into a fully filled state when the influent velocity $V_{in}$ of the treatment target water W2 is greater than 0.5 m/s.

It has been found that the effluent characteristics that the effluent flow ratios monotonically increase with the distances L away from the inlet of the branch pipes 112, can be maintained if the influent velocity $V_{in}$ is greater than 0.5 m/s and equal to or less than 100 m/s. However, making the influent velocity greater than 5.0 m/s is not preferable because the influent pressure caused by the treatment target water W2 when it is flown into the main pipe 111 of the distributor pipe 11, becomes extremely large. In view of the above, the upper limit of the influent velocity $V_{in}$ is preferably equal to or less than 5.0 m/s. Moreover, the inventors have confirmed that the above trend of the effluent characteristics are maintained when the pipe diameter $D_0$ of the main pipe 111 is equal to or greater than 42.7 mm (the inner diameter of the 32A piping for Sch20 being 36.7 mm) and equal to or less than 60.5 mm (the inner diameter of the 50A piping for Sch20 being 53.5 mm). Accordingly, the lower limit of the flow rate of the treatment target water W2 to be flown into the distributor pipe 11 is 31.5 L/min when the piping area is $1.05 \times 10^{-3}$ m$^2$ and the fluid velocity is 0.5 m/s. In contrast, the upper limit of the flow rate of the treatment target water W2 to be flown into the distributor pipe 11 is 674.4 L/min when the piping area is $2.25 \times 10^{-3}$ m$^2$ and the fluid velocity is 5.0 m/s. From the studies above, the inventors have found that the range of the influent rate of the treatment target water W2 to be flown into the distributor pipe 11 is preferably equal to or greater than 31.5 L/min and equal to or less than 674.4 L/min.

Figure 10:
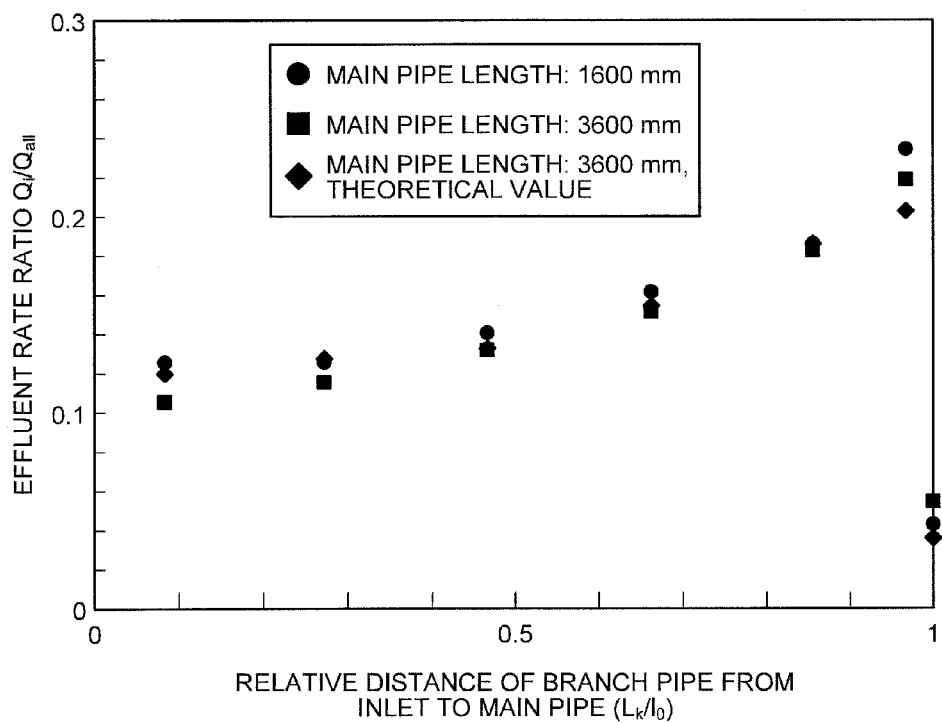
FIG. 10 is a graph illustrating dependence on distances away from the inlet, of effluent flow ratios of branch pipes, with respect to the lengths of the main pipe of the distributor pipe according to the embodiment.

Further, the inventors have studied whether the above described trend of the effluent characteristics can be obtained even when the length along the longitudinal direction of the main pipe 111 is increased. Results of various experiments and analyses are illustrated in FIG. 10. FIG. 10 is a graph illustrating dependence on the distances away from the inlet, of the effluent flow ratios $Q_i/Q_{an}$ when the length of the main pipe 111 is changed in the distributor pipe 11 according to this embodiment. FIG. 10 illustrates the results of a case where the length of the main pipe 111 is 1600 mm, another case where the length of the main pipe 111 is as long as 3600 mm with the ratio among arrangement positions of the respective branch pipes 112 from the influent side being maintained unchanged, and a case where numerical analysis is performed. The horizontal axis in FIG. 10 represents relative distances $L_k/l_0$ of the distances of the branch pipes 112 away from the inlet, with respect to the lengths of the main pipe 111. From FIG. 10, it is found that even if the length of the main pipe 111 is increased, the effluent flow ratios $Q_i/Q_{all}$ of the treatment target water W2 flowing out from the respective branch pipes 112 monotonically increase from the influent side to the effluent side and demonstrate approximately the same trend. Further, the inventors have calculated a difference between a theoretical value and a measured value, and confirmed that the difference is 2% or less.

Figure 11:
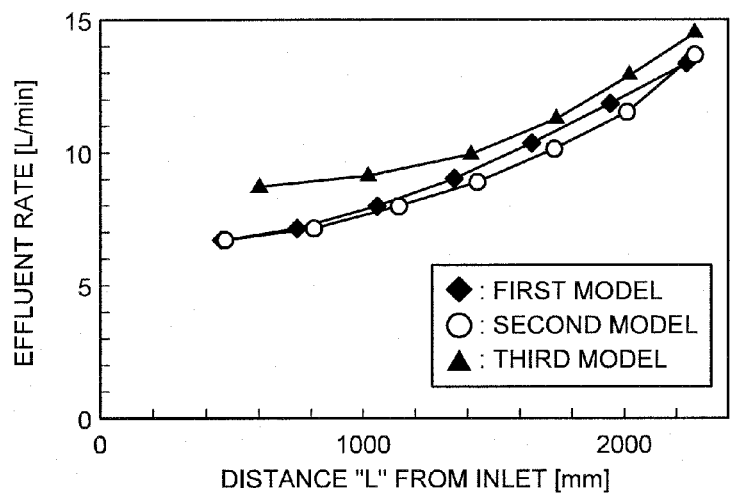
FIG. 11 is a graph illustrating dependence on distances away from the inlet, of effluent rates in three models of the distributor pipes according to the embodiment.

Further, the inventors have intensively conducted studies related to the distributor pipe 11 based on the above described experiments illustrated in FIG. 6. The inventors have conducted experiments and simulations by changing the number of the branch pipes 112 and the intervals between the branch pipes 112, for the above described distributor pipe 11 illustrated in FIG. 4. In these experiments and simulations, the influent end of the distributor pipe 11 is at a position about 400 mm away from the center of the axis C of the rotary distributor 12, the position being the position of the flange. The results are illustrated in FIG. 11. FIG. 11 is a graph illustrating dependence on distances away from the inlet, of effluent rates in three models of the distributor pipes 11. Among which, two models of a first model and a second model are not provided with the branch pipe 113, but each has a main pipe 111 with a length $l_0$ of, for example, 2200 mm, and seven (n=7) branch pipes 112. For the first and second models, the intervals between the branch pipes 112 along the main pipes 111 are differently arranged, and the changes in the effluent flow ratios due to the differences between the intervals of the outlets 112a have been measured. Further, the distributor pipe 11 of a third model shown in FIG. 11 has a main pipe 111 with a length $l_0$ of, for example, 2000 mm, and six branch pipes 112 (n=6).

As illustrated in FIG. 11, among the distributor pipes 11 of the first to third models, each has the effluent characteristics that the effluent flow ratios monotonically increase as the distances away from the inlet increase. The inventors have conducted further studies on the distributor pipes 11 of these first to third models. The inventors found that the results of the first model and second model quantitatively match each other, as shown in FIG. 11. In other words, the inventors have found that the effluent rates of the branch pipes 112 serving as a discharge pipes are hardly influenced by the distances from the influent end (inlet) and the intervals between the branch pipes 112. As shown by FIG. 11, the effluent characteristics based on the orders of the branch pipes 112 in the first model and second model almost match each other. Accordingly, the inventors have concluded that the influence of changing the outlet intervals on the effluent flow ratios is small and the determinant related to the effluent flow ratios is the arrangement orders of the branch pipes 112 from the inlet. By experiments and fluid analysis the inventors have derived that the effluent rates of the treatment target water W2 are dependent on the number of the branch pipes 112 from the influent side of the distributor pipe 11, that is, the orders of the branch pipes 112 from the influent side.

Figure 12:
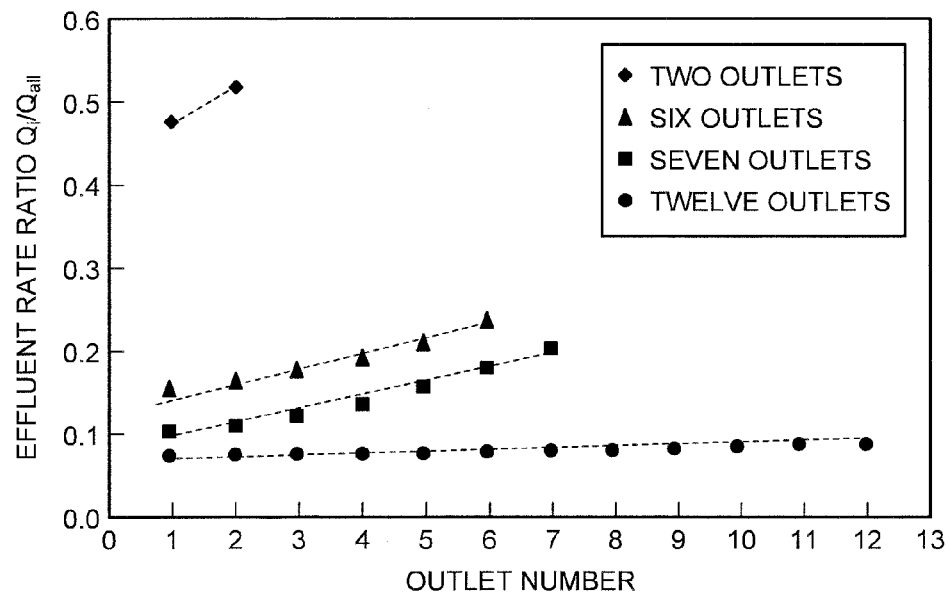
FIG. 12 is a graph illustrating respective effluent flow ratios of the outlets in order starting with the one nearest to the inlet of the distributor pipe with respect to the numbers of the outlets in the distributor pipes according to the embodiment.

Further, the inventors have conducted experiments and studies related to the effluent flow ratio of each branch pipe 112 in the distributor pipes 11 by further increasing or decreasing the number of the branch pipes 112. The results are illustrated in FIG. 12. FIG. 12 is a graph illustrating the effluent flow ratios with respect to the orders (outlet numbers) of the branch pipes 112 from the inlets when the distributor pipes 11 of the second and third models illustrated in FIG. 11 and the distributor pipes 11 having two branch pipes 112 (the number of outlets: two) and twelve respectively (the number of outlets: twelve) are used.

From FIG. 12, the effluent flow ratios are found to nearly linearly and monotonically increase with the positional orders of the outlets even if the number of branch pipes is increased or decreased in the distributor pipe 11. That is, even if the number of the branch pipes 112, that is, the number of the outlets, is changed, the trend of the flow rates increasing linearly from the influent side to the effluent side is found to remain unchanged. According to the studies of the inventors, the gradient of the increase is considered to be determined by the ratio of the pipe diameter $D_1$ of the branch pipe 112 to the pipe diameter $D_0$ of the main pipe 111. However, the distributor pipe 11 is primarily a spraying means for spraying the treatment target water W2 over the filter bed body 10. Considering this point, if the number of the branch pipes 112 is as small as about two (the number of outlets: two), although the effluent rate can be maintained, the treatment target water W2 becomes difficult to be sprayed over a wide range. On the contrary, if the number of the branch pipes 112 is as many as twelve (the number of outlets: twelve), the flow rate flown out from each of the branch pipes 112 is decreased. Further, since the effluent loss of the outlet 112a of the branch pipe 112 is larger than the piping loss, the effluent from the first branch pipe 112 provided at the most influent side is considered to be determined by the number of branch pipes, that is, the number of outlets.

Based on the above studies, the inventors have found that the number of outlets is preferably five to nine, that is, the number of the branch pipes 112 is five to nine, and more preferably, the number of the outlets is six to eight, that is, the number of the branch pipes 112 is six to eight. The inventors have found that by making the number of the branch pipes 112 within these ranges, uniform distribution of the treatment target water W2 can be realized. The number of these branch pipes 112 is determined according to the size of the trickling filter 3, that is, the throughput of the apparatus, and is not necessarily limited to these numbers, but considering the size of the filter bed body 10 of a conventional trickling filter 3, the number of the branch pipes 112 is preferably set in the above ranges.

Figure 13:
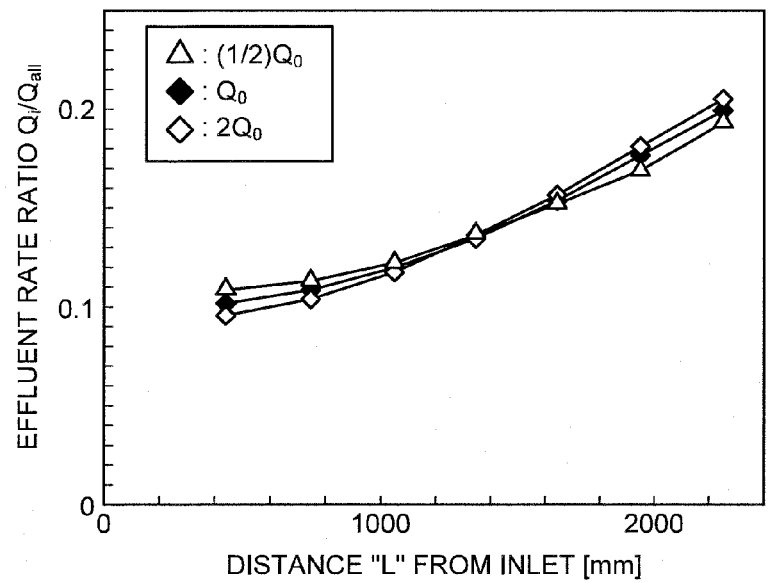
FIG. 13 is a graph illustrating dependence on distances away from the inlet, of effluent flow ratios in a state where the influent rates for the distributor pipe are changed, according to the embodiment.

Further, the inventors have measured the effluent flow ratios $Q_i/Q_{all}$ in each of the branch pipes 112 by using the above described distributor pipe 11 of the second model provided with seven branch pipes 112 and changing the influent rate in a range of half to twice the reference influent rate $Q_0$. The influent velocity is, for example, 1.81 m/s. FIG. 13 is a graph illustrating the results and thus the dependence on distances away from the inlet, of the effluent flow ratios of the branch pipes 112. In this measurement of the effluent flow ratios $Q_i/Q_{all}$ the influent end of the distributor pipe 11 is assumed to be at a position about 400 mm away from the center of the axis C of the rotary distributor 12, the position being the position of the flange.

From FIG. 13, it has been found that even if the influent rate is changed, the effluent flow ratios in each of the branch pipes 112 hardly change and are not dependent on the influent rate. The inventors have calculated the deviation in the effluent flow ratio according to the change in the influent rate and confirmed that the deviation in the effluent flow ratios is in a nearly negligible range of equal to or less than 7%. The inventors have further performed fluid analysis for a case where the influent rate is half to twice the reference influent rate $Q_0$ by using the distributor pipe 11 of the second model provided with the seven branch pipes 112, similar results are obtained. The distributor pipe 11 according to the embodiment has been invented based on the above intensive studies.

Figure 14:
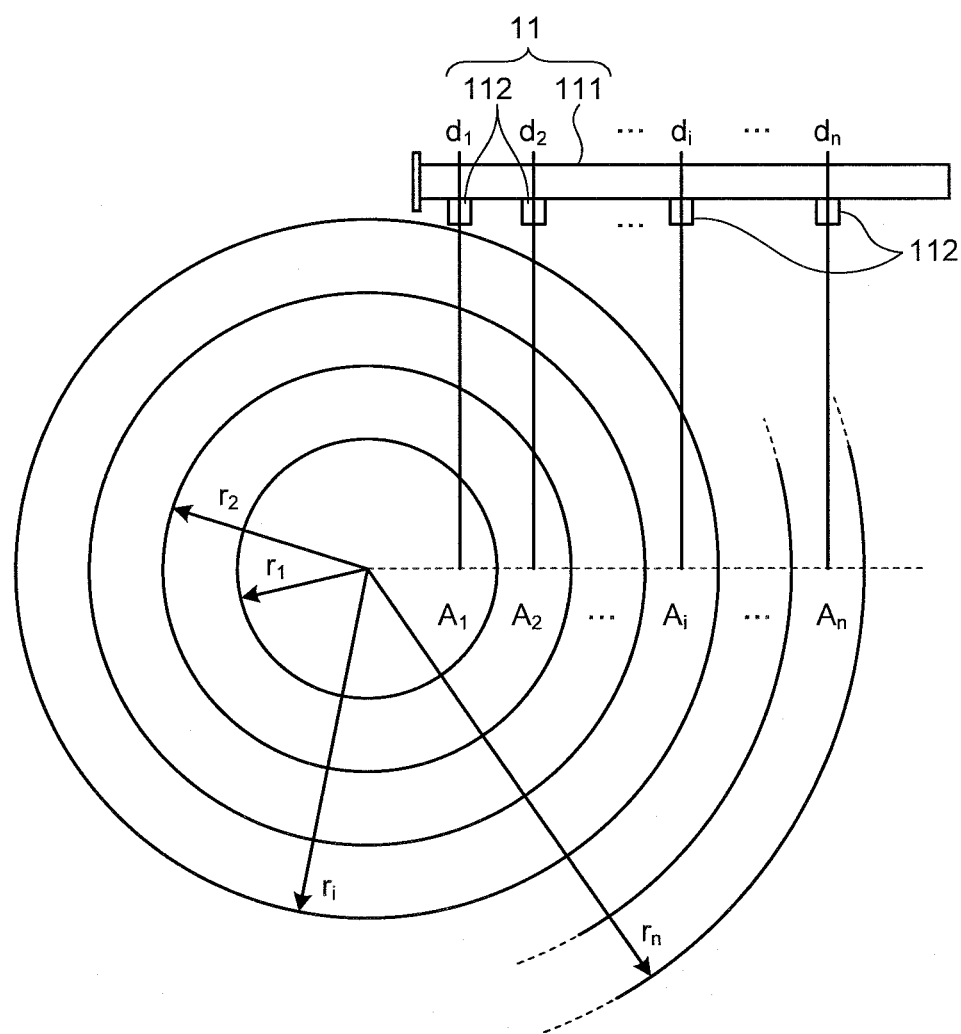
FIG. 14 is a schematic diagram for explaining a method of calculating spraying allotment areas related to spraying amounts from the outlets of respective branch pipes in the distributor pipe according to the embodiment.

Next, a method of realizing uniform distribution over a surface parallel to a horizontal plane of the filter bed body 10 by the arrangement of the branch pipes 112 in the distributor pipe 11 according to this embodiment will be described. FIG. 14 is a schematic diagram illustrating a correspondence between the arrangement positions of the branch pipes 112 arranged in the distributor pipe 11 according to this embodiment and spraying area.

As illustrated in FIG. 14, the distributor pipe 11 is configured of the main pipe 111 and the plurality of branch pipes 112. The distributor pipe 11 is rotated around its end portion at the influent side by the reaction generated by the discharging of the treatment target water W2 from the branch pipes 112. In this case, each of the branch pipes 112 at the arrangement positions of $d_1, d_2, \ldots, d_i, \ldots,$ and $d_n$ sprays the treatment target water W2 over a circular or hollow-circular section in the horizontal plane of the filter bed body 10. The spraying area of each of the branch pipes 112 can be expressed by the following Equation (2). That is, the branch pipe 112 positioned at the arrangement positions $d_i$ need to spray the treatment target water W2 over a spraying area $A_i$ defined by the following Equation (2).

$$A_i = \pi(r_i^2 - r_{i-1}^2) \quad (2)$$

In the equation, $r_i$ is the distances at the far side from the center of the horizontal plane of the filter bed body 10, of the section sprayed by the branch pipe 112 arranged at the arrangement positions $d_i$. Further, $r_0=0$, and $A_1=\pi r_1^2$.

A target flow rate $q_{ave}$ of the treatment target water W2 sprayed per unit area along the horizontal plane of the filter bed body 10 is calculated by the following Equation (3) from the total area $A_{all}$ along the horizontal plane of the filter bed body 10 and the influent rate $Q_{all}$ of the treatment target water W2.

$$q_{ave} = Q_{all}/A_{all} \quad (3)$$

In order to uniformly spray the treatment target water W2 over the surface along the horizontal plane in the filter bed body 10, the flow rate per unit area of the treatment target water W2 in the section allotted to each of the branch pipes 112 is desirably equal to the target flow rate $q_{ave}$. That is, the following Equation (4) desirably holds, such that the effluent rate $Q_i/A_i$ per unit area of the treatment target water W2 flown out from the branch pipe 112 arranged at the arrangement positions $d_i$ in the distributor pipe 11 to the horizontal plane of the filter bed body 10 is equal to the target flow rate $q_{ave}$.

$$q_{ave} = \frac{Q_{all}}{A_{all}} = \frac{Q_i}{A_i} = \frac{Q_i}{\pi(r_i^2 - r_{i-1}^2)} \quad (4)$$

Specifically, for example, it is assumed that the influent rate $Q_{all}$ of the treatment target water W2 flown into the trickling filter 3 is 72 L/min, the influent velocity $V_{in}$ thereof is 1.8 m/s, and the area along the horizontal plane of the filter bed body 10 is 18 m². In this case, the target flow rate $q_{ave}$ per unit area of the treatment target water W2 supplied to the filter bed body 10 is, for example, 4.0 L/min·m².

As described above, the inventors have already found that the effluent flow ratios $Q_i/Q_{all}$ of each of the branch pipes 112 at their respective arrangement positions $d_i$ are not dependent on the influent rate $Q_{all}$. Further, the effluent rates $Q_i$ of the branch pipes 112 in the distributor pipe 11 have already been found to be dependent on their respective arrangement orders, and monotonically increase with the orders from the influent side, but are not dependent on their respective arrangement positions, if the pipe diameter ratio between the main pipe 111 and the branch pipe 112 is set in a predetermined range. Therefore, in order to have the distributor pipe 11 uniformly spray the treatment target water W2 over the filter bed body 10, first, the effluent flow ratios $Q_i/Q_{all}$ in each of the branch pipes 112 illustrated in FIG. 12 are calculated from an approximation function generated from the results obtained by the fluid analysis. If the influent rate $Q_{all}$ is assumed to be a constant, the effluent rates $Q_i$ of the branch pipes 112 can be assumed to be a constant determined by their respective arrangement orders. Next, based on the assumption, the arrangement position $d_i$ of each of the branch pipes 112 is determined such that the above Equation (4) holds. As a result, uniform distribution by the distributor pipe 11 is considered to be able to be achieved. The spraying areas $A_i$ allotted to the branch pipes 112 at the arrangement positions $d_i$ are almost substantially determined by the intervals between the arrangement position $d_i$ and the arrangement position $d_{i-1}$ since $r_i$ is almost determined if the arrangement position $d_i$ is determined.

An example of a method of deriving $Q_i$, which has been assumed above to be a constant, will be described as follows. First, the pipe diameter $D_2$ of the branch pipe 113 is determined. As described above, the pipe diameter $D_2$ of the branch pipe 113 is determined based on the pipe diameter ratio thereof to the pipe diameter $D_0$ of the main pipe 111. Accordingly, the pipe diameter ratio $D_2/D_0$ of the pipe diameter $D_2$ of the branch pipe 113 to the pipe diameter $D_0$ of the main pipe 111 is assumed to be, for example, "0.25". Next, the number of the branch pipes 112 is determined. In this embodiment, the number of the branch pipes 112 is assumed to be, for example, six, which is in the above described range of the number of pipes. Based on the results of inlet flow velocity $V_z$ at the outlets 112a of the branch pipes 112 obtained by the numerical analysis on the number of branch pipes 112, the following Equation (5) is derived as an approximation equation that has been modelled. This Equation (5) is determined by the arrangement orders of the branch pipes 112. In the following Equation (5), $V_{in}$ is the influent velocity, "i" is the arrangement order of the branch pipes 112, and "N" is the number of branch pipes 112 in the distributor pipe 11.

$$\left(\frac{V_z}{V_{in}}\right) = a \cdot \left(\frac{i-1}{N}\right)^2 + b \cdot \left(\frac{i-1}{N}\right) + 1 \tag{5}$$

Coefficients "a" and "b" of the approximation equation are calculated based on the results of the inlet flow velocity $V_z$ of the branch pipe 112 obtained by the above described numerical analysis. When values of these coefficients "a" and "b" are substituted into Equation (5), the following Equation (6) is derived. As a result, an approximation equation for a ratio of the inlet flow velocity $V_z$ in the branch pipes 112 to the influent velocity $V_{in}$ is obtained.

$$\frac{V_z}{V_{in}} = \left\{1.316\left(\frac{D_1}{D_0}\right)^2 - 2.264\left(\frac{D_1}{D_0}\right) + 0.6341\right\} \cdot \left(\frac{i-1}{N}\right)^2 + \left\{-0.6631\left(\frac{D_1}{D_0}\right)^2 - 1.5939\left(\frac{D_1}{D_0}\right)\right\} \cdot \left(\frac{i-1}{N}\right) + 1 \tag{6}$$

Figure 5C:
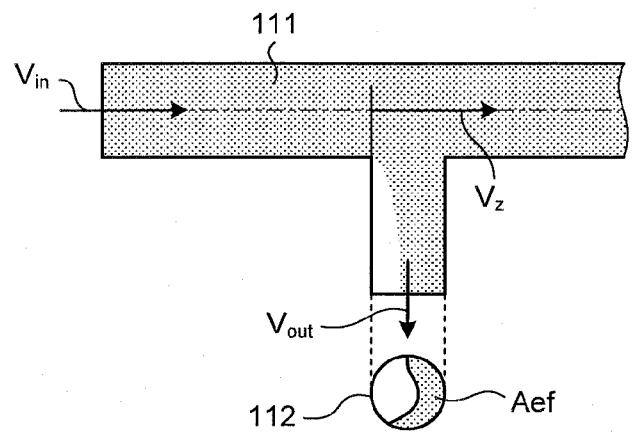
FIG. 5C is a schematic diagram illustrating an effluent in the branch pipe of the distributor pipe according to the embodiment.

FIG. 5C is a schematic diagram illustrating an effluent in the branch pipes 112. As illustrated in FIG. 5C, the treatment target water W2 flown out from the branch pipes 112 is crescent shaped with respect to a cross section perpendicular to the longitudinal direction of the branch pipe 112 if the pipe diameter ratio of the branch pipes 112 to the main pipe 111 is greater than "0.2". Further, according to findings of the inventors, the crescent shaped effective flow passage area $A_{ef}$ changes according to the pipe diameter ratio $D_1/D_0$ of the branch pipe 112 to the main pipe 111. Specifically, as illustrated below from (i) to (v), Equation (7) to Equation (11), which are quadratic function approximation equations, are obtained.

(i) When the pipe diameter ratio $D_1/D_0$ is equal to "0.2", the contribution ratio becomes "1" and the following Equation (7) holds.

$$\frac{A_{ef}}{A} = 1 \times 10^{-14}\left(\frac{V_z}{V_{in}}\right)^2 - 2 \times 10^{-14}\left(\frac{V_z}{V_{in}}\right) + 0.9868 \tag{7}$$

(ii) When the pipe diameter ratio $D_1/D_0$ is equal to "0.4", the contribution ratio becomes "0.99" and the following Equation (8) holds.

$$\frac{A_{ef}}{A} = 0.0256\left(\frac{V_z}{V_{in}}\right)^2 - 0.2451\left(\frac{V_z}{V_{in}}\right) + 0.9214 \tag{8}$$

(iii) When the pipe diameter ratio $D_1/D_0$ is equal to "0.6", the contribution ratio becomes "0.99" and the following Equation (9) holds.

$$\frac{A_{ef}}{A} = 0.4491\left(\frac{V_z}{V_{in}}\right)^2 - 1.1418\left(\frac{V_z}{V_{in}}\right) + 1.0864 \tag{9}$$

(iv) When the pipe diameter ratio $D_1/D_0$ is equal to "0.8", the contribution ratio becomes "0.99" and the following Equation (10) holds.

$$\frac{A_{ef}}{A} = 0.4892\left(\frac{V_z}{V_{in}}\right)^2 - 1.3005\left(\frac{V_z}{V_{in}}\right) + 1.1002 \tag{10}$$

(v) When the pipe diameter ratio $D_1/D_0$ is equal to "1", the contribution ratio becomes "0.98" and the following Equation (11) holds.

$$\frac{A_{ef}}{A} = 1.2086\left(\frac{V_z}{V_{in}}\right)^2 - 2.285\left(\frac{V_z}{V_{in}}\right) + 1.2739 \tag{11}$$

Based on above the effective flow passage area $A_{ef}$ upon effluent from the branch pipes 112, the effluent rate $Q_i$ flown out from each of the branch pipes 112 can be found by multiplying the effective flow passage area $A_{ef}$ in that branch pipe 112 by the average effluent flow velocity $V_{out}$. According to findings by the inventors, by conducting numerical analysis on the pipe diameter ratio $D_1/D_0$ of the pipe diameter $D_1$ of the branch pipe 112 to the pipe diameter $D_0$ of the main pipe 111, the flow velocity ratio $V_{out}/V_{in}$ of the average effluent flow velocity $V_{out}$ to the influent velocity $V_{in}$ can be obtained. An example of this flow velocity ratio $V_{out}/V_{in}$ of the average effluent flow velocity $V_{out}$ to the influent velocity $V_{in}$ can be expressed by the following Equation (12), which is an approximation equation.

$$\frac{V_{out}}{V_{in}} = e^{-0.8084} \cdot \left(\frac{D_1}{D_0}\right)^{-1.222} \tag{12}$$

By multiplying (the following Equation (13)) the effective flow passage area $A_{ef}$ in the above Equation (6) to Equation (11) by the average effluent flow velocity $V_{out}$ of this Equation (13), the effluent rates $Q_i$ can be derived.

$$Q_i = A_{ef} V_{out} \tag{13}$$

After the effluent rates $Q_i$ in the branch pipes 112 at the arrangement positions $d_i$ are determined, since this effluent rates $Q_i$ can be assumed to be a constant, by determining the arrangement positions $d_i$ of each of the branch pipes 112 such that the above Equation (4) holds, uniform distribution can be realized by the distributor pipe 11.

Working Example

Next, an example of the distributor pipe 11 determined as described above will be described. The number of the branch pipes 112 illustrated in FIG. 4 is assumed to be seven (n=7). In this case, the ratio $l_1/l_0$ of the interval $l_1$ between the arrangement position $d_1$ of the branch pipe 112 and the influent end of the main pipe 111 to the main pipe length $l_0$ of the main pipe 111 is "$l_1/l_0$=0.12". Further, the ratio $l_2/l_0$ of the interval $l_2$ between the branch pipe 112 at the arrangement position $d_2$ and the branch pipe 112 at the arrangement position $d_1$ to the main pipe length $l_0$ of the main pipe 111 is "$l_2/l_0$=0.20". Similarly, the ratio $l_3/l_0$ is, for example, "$l_3/l_0$=0.14"; the ratio $l_4/l_0$ is, for example, "$l_4/l_0$=0.123"; the ratio $l_5/l_0$ is, for example, "$l_5/l_0$=0.119"; the ratio $l_6/l_0$ is, for example, "$l_6/l_0$=0.119"; and the ratio $l_7/l_0$ is, for example, "$l_7/l_0$=0.119". The ratio $l_8/l_0$ of the interval $l_8$ between the branch pipe 112 at the arrangement position $d_7$ and the effluent end of the main pipe 111 to the main pipe length $l_0$ of the main pipe 111 is "$l_8/l_0$=0.06".

Figure 15:
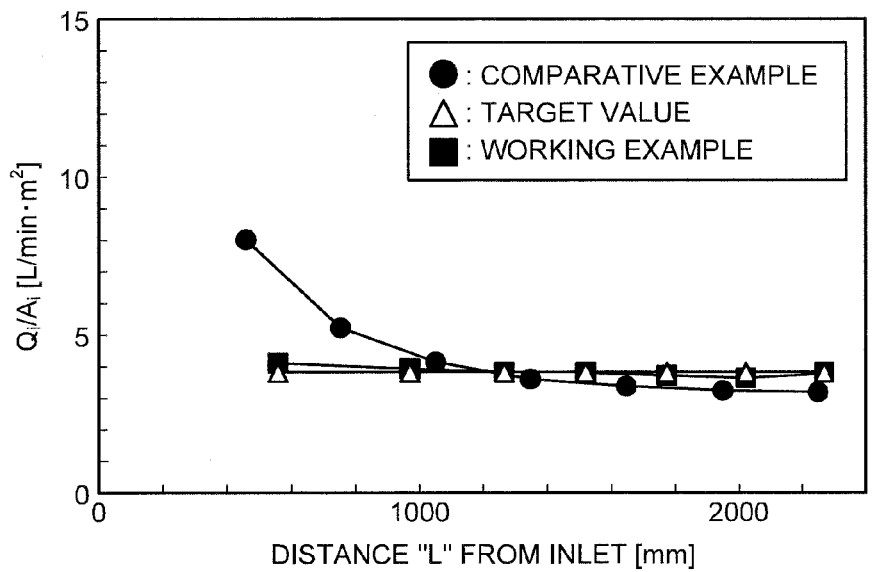
FIG. 15 is a graph illustrating dependences on distances away from the inlet, of spraying amounts per unit area and per unit time of the distributor pipes according to a working example of the embodiment and a comparative example.

The inventors have measured the effluent rates $Q_i/A_i$ per unit area by using the distributor pipe 11 according to a working example configured as described above, and as well the effluent rates per unit area in a comparative example by using the distributor pipe 11 of the second model described above. Results of these measurements are illustrated in FIG. 15. FIG. 15 is a graph illustrating dependence on distances away from the inlet, of spraying amounts per unit area and per unit time in the distributor pipes according to the working example and the comparative example. In FIG. 15, the ideal effluent rates $Q_i/A_i$ per unit area are illustrated as certain target values (in the figure, with open triangles). Further, the measurement of the effluent rate per unit area is conducted under conditions close to the actual rotation upon spraying, viz. the influent end of the distributor pipe 11 is at a position about 400 mm away from the center of the axis C of the rotary distributor 12, the position being the position of the flange.

From FIG. 15, it is found that in the comparative example, the effluent rates $Q_i/A_i$ per unit area of the first to the third branch pipes from the influent end of the distributor pipe deviate largely from the target values, while in the working example, the effluent rates $Q_i/A_i$ per unit area have characteristics similar to those of the target values, and uniform distribution over the filter bed body 10 is achieved. According to calculation by the inventors, the deviation of the effluent rates from each of the branch pipes 112 of this distributor pipe 11 with respect to the target value is about 7% at most.

Figure 16:
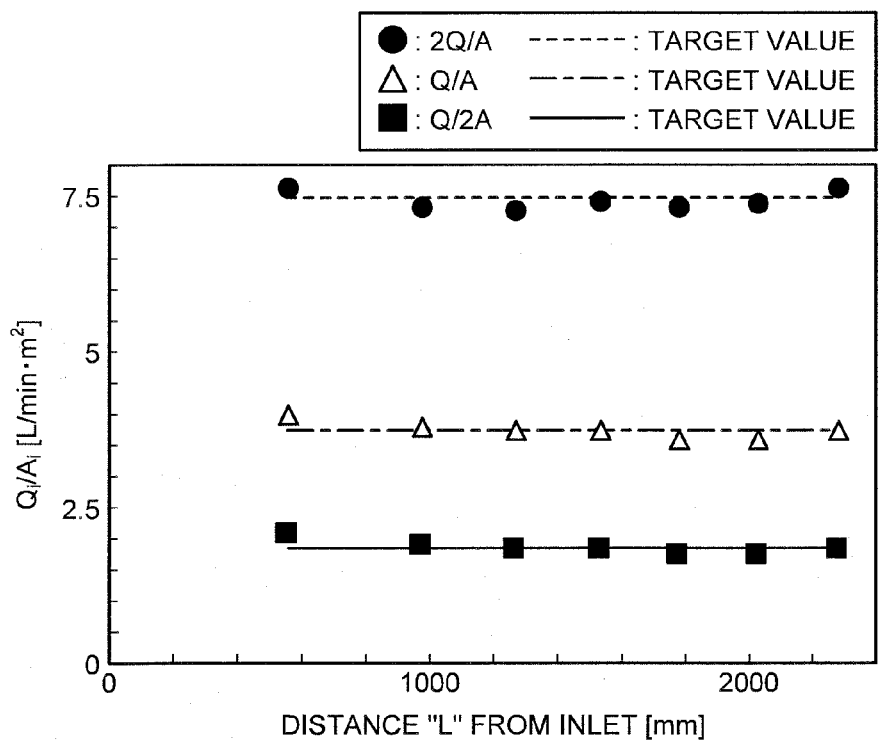
FIG. 16 is a graph illustrating dependence on distances away from the inlet, of spraying amounts per unit area and per unit time of the distributor pipe, with respect to the influent rates according to the working example of the embodiment.

Further, the effluent rates $Q_i/A_i$ per unit area in a case under conditions where the influent rates are set half to twice the reference influent rate have been measured by using the distributor pipe 11 according to the working example configured as described above. Results of the measurement are illustrated in FIG. 16. FIG. 16 is a graph illustrating dependence on distances away from the inlet, of spraying amounts per unit area and per unit time in the distributor pipe 11 according to the working example, with respect to the influent rates. In FIG. 16, the ideal effluent rates $Q_i/A_i$ per unit area are illustrated as certain target values by using horizontal lines. Further, in this measurement of the effluent rate per unit area, the influent end of the distributor pipe 11 is positioned about 400 mm away from the center of the axis C of the rotary distributor 12. From FIG. 16, it is found that by the distributor pipe 11 according to the working example, even if the influent rate is increased or decreased, characteristics similar to those of the target values can be maintained and uniform distribution can be implemented.

As described above, by the trickling filter 3 using the distributor pipe 11 according to the embodiment, by setting the ratio $D_1/D_0$ between the pipe diameter $D_0$ of the main pipe 111 to the pipe diameter $D_1$ of the branch pipe 112, in the distributor pipe 11, to be in a predetermined range, and arranging the arrangement positions of the plurality of branch pipes 112 in the distributor pipe 11 appropriately, uniform distribution can be realized. As a result, treatment performance can be maintained, because the treatment performance of the trickling filter 3 can be improved, and even if the processing load fluctuates due to the fluctuation in the flow rate of the treatment target water W2 supplied to the distributor pipe 11, the effluent flow ratios from each of the branch pipes 112 can be maintained constant and uniform distribution becomes possible.

Specifically, as to the variation in the spraying amount for the spraying area along the horizontal plane of the filter bed body 10, from FIG. 14 and Equation (2), if values of "$r_i-r_{i-1}$" are equal among one another, the spraying area of the filter bed increases, as the position along the rotation radius direction is extended, that is, the spraying area of the filter bed increases along the order i of the branch pipes 112. However, if a header pipe according to a conventional technique with the pipe diameter ratio of the branch pipe 112 to the main pipe being equal to or less than "0.2" is used, the effluent rate from the branch pipe 112 follows the so-called principle of header pipes, such that the flow rates flowing out from the respective branch pipes become the same if the branch pipe diameter is small relatively to the main pipe diameter. Therefore, the flow rates of the treatment target water W2 flown out from all of the branch pipes 112 become equal to one another. The spraying amount density becomes excessive as it becomes closer to the influent end of the distributor pipe 11, that is, as it becomes closer to the center of the axis C of the rotary distributor 12, while asymptotically decreasing as it becomes closer to the effluent end of the distributor pipe 11, that is, to the outer side. On the contrary, according to the above described embodiment of the present invention, by increasing the pipe diameter $D_1$ of the branch pipe 112 relatively to the pipe diameter $D_0$ of the main pipe so that the ratio between them is made greater than "0.2", the above described principle of header pipes is intentionally broken. Moreover, similarly to the increase in the spraying area, since the effluent rate from the branch pipe 112 is configured to be adjustable to increase as it becomes closer to the effluent end, variation in the spraying strength over the filter bed body 10 can be suppressed, and the distributor pipe 11 and trickling filter 3, which are able to achieve uniform distribution, are able to be realized.

Further, according to the embodiment, the distributor pipe 11 is configured to be suspended from the apparatus ceiling 3a. Accordingly, in contrast to a configuration in which a support pillar is arranged on a bottom portion of a filter bed body and a distributor pipe is provided at a top portion of the support pillar, the problem of the treatment performance being reduced by the decrease in the effective area of the filter bed body worth the arrangement area of the support pillar for supporting the distributor and the distributor pipe can be avoided. Further, when a trickling filter is arranged in an existing reaction tank having a ceiling, in contrast to the configuration in which the support pillar is arranged on the bottom portion of the filter bed body and the distributor pipe is arranged at the top portion of the support pillar, the problem of large scale modification becoming necessary for the ceiling above the existing reaction tank, and large scale construction becoming necessary in the reaction tank for arranging the support pillar for providing the distributor pipe is not caused. By suspending the rotary distributor 12 from the ceiling in the trickling filter, in contrast to the configuration in which the support pillar is arranged on the bottom portion of the filter bed body and the distributor pipe is provided at the top portion of the support pillar, the effective area of the filter bed can be increased. Further, by the distributor pipe according to this embodiment, when the distributor pipe 11 is configured to be suspended from the apparatus ceiling 3a, uniform distribution, even considering the newly increased filter bed area can be achieved, and thus treatment performance can be improved.

As described, the embodiment has been described specifically, but the present invention is not limited to the above described embodiment and various modifications based on the technical concepts of the present invention may be made. For example, the numerical values exemplified in the above described embodiment are just examples, and numerical values different from them may be used as necessary.

Figure 17:
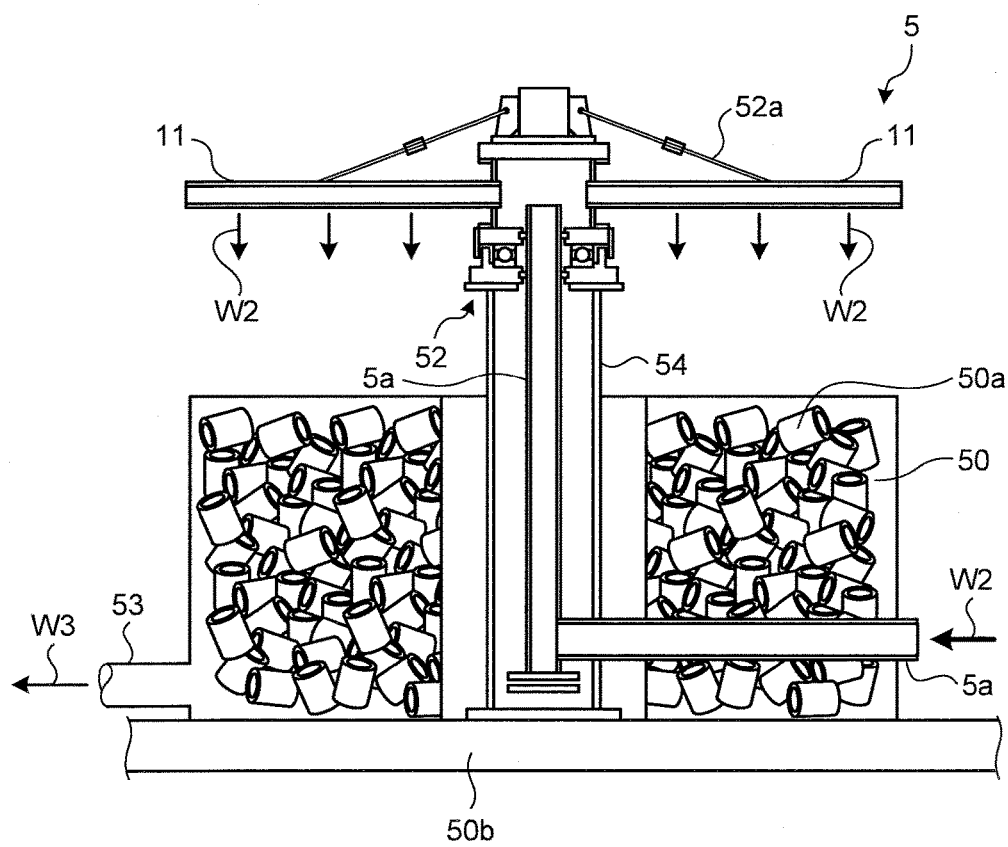
FIG. 17 is a sectional diagram illustrating an example of a configuration of a trickling filter according to a modified example of the embodiment.

For example, according to the above described embodiment, the trickling filter 3 is of the suspension type in which the distributor pipe 11 and the rotary distributor 12 are held by being suspended from the ceiling, but a support pillar type trickling filter 5 of a conventional configuration as illustrated in FIG. 17 may be also adopted. FIG. 17 is a sectional diagram illustrating an example of a configuration of a trickling filter according to a modified example of the embodiment corresponding to FIG. 3. As illustrated in FIG. 17, the support pillar type trickling filter 5 includes: a rotary distributor 52, which includes a filter bed body 50 including a filtering medium packed bed that is packed with filtering medium 50a, the distributor pipe 11, and a wire 52a; a vent pipe 53; and a support pillar 54, which stands up in a height direction on a filter bed bottom portion 50b. At a top portion of the support pillar 54, the rotary distributor 52 is provided. The rotary distributor 52 is configured to support the distributor pipe 11 by the wire 52a and to enable the distributor pipe 11 to rotate in a horizontal plane around an axis which is in a direction perpendicular to the longitudinal direction of the distributor pipe 11 and is at the end portion of the influent side. Further, the treatment target water W2 is supplied to the distributor pipe 11 through an influent pipe 5a illustrated in FIG. 17 from the solid-liquid separator 2 illustrated in FIG. 1. The vent pipe 53, similarly to the vent pipe 13, is a pipe for communicating the inside of the filter bed body 50 with the latter solid-liquid separator 4 illustrated in FIG. 1 and supplies the treated water W3 treated in the trickling filter 5 to the latter solid-liquid separator 4.

Although the latter solid-liquid separator 4 is provided downstream from the trickling filter 3 in the above described embodiment, the trickling filter 3 may serve as the final water treatment means and the treated water W3 by the trickling filter 3 may be discharged to the outside environment without a further treatment arranged downstream from the trickling filter 3. Though transparency of the treated water W3 by the above described trickling filter 3 is less than that of the treated water W4 by the latter solid-liquid separator 4, the treatment it receives can reach to an extent that its discharge to the outside environment is not environmentally problematic.

Further, for the above described embodiment, a trickling filter having a function of cleaning the filtering medium packed bed may be adopted.

In addition, in the above described embodiment, although substance being cylindrically shaped is used as the filtering medium 10a in the trickling filter 3, not necessarily limited to this example. Specifically, substance constituting the filtering medium 10a may be any of various shapes, such as a polygonal shape and a cross shape, as long as the shape makes the contact area between the filtering medium 10a and the treatment target water W2 as large as possible.

Moreover, according to the description of the embodiment, the trickling filter 3 includes the filter bed body 10 combined treatment water tanks of six, but the number of the treatment water tanks forming the filter bed body 10 is not limited to six. That is, the filter bed body 10 may be configured of a single treatment water tank or may be configured of a plurality of water treatment tanks other than six.

Furthermore, the trickling filter 3 according to the embodiment may sometimes fail to maintain the treatment performance due to a temporary pollution overload of the target water to be treated, even if uniform distribution is possibly maintained by the distributor pipe 11. In this case, the treatment performance in the trickling filter 3 can be ensured by sending the treated water back to the upstream treatment step to treat it again. Further, even if a temporary increase in the throughput is caused when the treated water W3 is sent back to join the sewage water W1 flown in to get retreated, since the effluent characteristics not dependent on the influent rate is demonstrated, uniform distribution over the filter bed body 10 is still to be possibly achieved. Accordingly, without inviting decrease in the treatment performance in the trickling filter 3, circulation treatment can be executed.

Further, the present invention is not limited by the above described embodiment any configuration that appropriately combines structural elements described above are included in the present invention. Furthermore, any other embodiments, working examples, operation techniques, and the like made by those skilled in the art or the like based on the above described embodiment are all included in the present invention.

REFERENCE SIGNS LIST 1 sewage treatment system
2 solid-liquid separator
3, 5 trickling filter
3a apparatus ceiling
3b influent pipe
4 latter solid-liquid separator
5a influent pipe
10 filter bed body
10a filtering medium
50b filter bed bottom portion
11 distributor pipe
12, 52 rotary distributor
12a, 52a wire
13, 53 vent pipe
50 filter bed body
54 support pillar
111 main pipe
112, 113 branch pipe
112a, 113a outlet
W1 sewage water
W2 treatment target water
W3, W4 treated water

The invention claimed is:

1. A distributor pipe, comprising:
a main pipe including a cylindrical part;
a plurality of branch pipes communicating with the main pipe and arranged, on a cylindrical curved surface of the main pipe, side by side along a longitudinal direction of the main pipe; and
an influent pipe from which liquid is provided to the main pipe, wherein the influent pipe provides the liquid to the main pipe with a flow velocity range greater than 0.5 m/s and not greater than 100 m/s and a pipe diameter ratio $D_1/D_0$ of a pipe diameter $D_1$ of the branch pipe to a pipe diameter $D_0$ of the main pipe is greater than 0.2 and less than 0.8 such that respective effluent flow ratios which are ratios of effluent rates from the respective branch pipes to an influent rate to the main pipe is set so that the closer the branch pipe is to a downstream-side of the liquid the larger the effluent flow ratio becomes, and the plurality of branch pipes are arranged with intervals having predetermined interval lengths between one another according to: the effluent flow ratios and spraying allotment areas where the liquid is sprayed from the plurality of branch pipes, wherein the cylindrical part of the main pipe is a hollow cylindrical part having an upstream influent end and a downstream effluent end, each at opposite ends of the main pipe, and the hollow cylindrical part of the main pipe having a substantially constant diameter that extends to the outermost edge of the effluent end of the main pipe, a discharge outlet nozzle is provided at the outermost end of the hollow cylindrical part at the effluent end of the main pipe, such that the discharge nozzle is in direct communication with the substantially constant diameter at the outermost edge of the effluent end of the main pipe, for discharging liquid to the outside from the hollow cylindrical part of the main pipe, and a pipe diameter $D_2$ of the discharge outlet nozzle is smaller than the pipe diameter $D_1$ of the branch pipes.

2. The distributor pipe according to claim 1, wherein the flow velocity range is greater than 0.5 m/s and not greater than 5.0 m/s.

3. The distributor pipe according to claim 1, wherein the number of the branch pipes is five to nine.

4. The distributor pipe according to claim 2, wherein the number of the branch pipes is five to nine.

5. The distributor pipe according to claim 1, wherein the ratio $D_1/D_0$ of the pipe diameter $D_1$ of the branch pipe to the pipe diameter $D_0$ of the main pipe is 0.5 to 0.7.

6. A trickling filter, comprising:
the distributor pipe according to claim 1; and
a filter bed performing a biological treatment to treatment target water discharged from the distributor pipe,
wherein the spraying allotment area in each of the branch pipes is a spraying area along a horizontal plane over the filter bed.

7. A trickling filter, comprising:
the distributor pipe according to claim 2; and
a filter bed performing a biological treatment to treatment target water discharged from the distributor pipe,
wherein the spraying allotment area in each of the branch pipes is a spraying area along a horizontal plane over the filter bed.

8. A trickling filter, comprising:
the distributor pipe according to claim 3; and
a filter bed performing a biological treatment to treatment target water discharged from the distributor pipe,
wherein the spraying allotment area in each of the branch pipes is a spraying area along a horizontal plane over the filter bed.

9. A trickling filter, comprising:
the distributor pipe according to claim 4; and
a filter bed performing a biological treatment to treatment target water discharged from the distributor pipe,
wherein the spraying allotment area in each of the branch pipes is a spraying area along a horizontal plane over the filter bed.

10. The trickling filter according to claim 6, wherein the distributor pipe of the trickling filter is held by being suspended from above the filter bed.

11. The trickling filter according to claim 7, wherein the distributor pipe of the trickling filter is held by being suspended from above the filter bed.

12. The trickling filter according to claim 8, wherein the distributor pipe of the trickling filter is held by being suspended from above the filter bed.

13. The trickling filter according to claim 9, wherein the distributor pipe of the trickling filter is held by being suspended from above the filter bed.

14. The distributor pipe according to claim 5, wherein a pipe diameter ratio $D_2/D_0$ is greater than 0 and smaller than 0.65.

* * * * *